US006389433B1

(12) United States Patent
Bolosky et al.

(10) Patent No.: US 6,389,433 B1
(45) Date of Patent: *May 14, 2002

(54) METHOD AND SYSTEM FOR AUTOMATICALLY MERGING FILES INTO A SINGLE INSTANCE STORE

(75) Inventors: William J. Bolosky, Issaquah; John R. Douceur, Bellevue; Scott M. Cutshall, Carnation, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/354,660

(22) Filed: Jul. 16, 1999

(51) Int. Cl.[7] .............................................. G06F 12/00
(52) U.S. Cl. ...................... 707/205; 707/200; 707/201; 707/202; 707/203; 707/204; 707/3; 707/1; 707/10
(58) Field of Search .................... 707/1, 3, 10, 200–205

(56) References Cited

U.S. PATENT DOCUMENTS

| | | | |
|---|---|---|---|
| 5,410,667 A | | 4/1995 | Belsan et al. |
| 5,706,510 A | | 1/1998 | Burgoon |
| 5,778,384 A | * | 7/1998 | Provino et al. ............. 707/200 |
| 5,778,395 A | * | 7/1998 | Whiting et al. ............. 707/204 |
| 5,907,673 A | * | 5/1999 | Hirayama et al. ..... 395/182.14 |
| 5,918,229 A | | 6/1999 | Davis et al. |
| 6,185,574 B1 | * | 2/2001 | Howard et al. ............. 707/200 |

FOREIGN PATENT DOCUMENTS

| | | |
|---|---|---|
| EP | 0 774 715 A1 | 5/1997 |
| WO | WO 99/09480 | 2/1999 |
| WO | WO 99/12098 | 3/1999 |
| WO | WO 99/21082 | 4/1999 |

OTHER PUBLICATIONS

LaLonde, Ken, "Batch daemon—README", UNIX Batch Command, University of Toronto, pp. 1–3 (Feb. 27, 1997), ftp://ftp.cs.toronto.edu/pub/batch.tar.z printed Dec. 8, 2000.

Steere et al., "A Feedback–driven Proportion Allocator for Real–Rate Scheduling", *Third Symposium on Operating Systems Design and Implementation (OSDI '99)*, USENIX Association, pp. 145–158 (1999).

* cited by examiner

*Primary Examiner*—Hosain T. Alam
*Assistant Examiner*—Cam-Y Truong
(74) *Attorney, Agent, or Firm*—Michalik & Wylie, PLLC

(57) ABSTRACT

A method and system that operates as a background process automatically identify and merge duplicate files into a single instance files, wherein the duplicate files become independent links to the single instance files. A groveler maintains a database of information about the files on a volume, including a file size and checksum (signature) based on the file contents. The groveler periodically acts in the background to scan the USN log, a log that dynamically records file system activity. New or modified files detected in the USN log are queued as work items, each work item representing a file. The volume may be scanned to add work items to the queue, which takes place initially or when there is a potential problem with the USN log. The groveler periodically removes items from the queue, calculates the signature of the corresponding file contents, and uses the signature and file size to query the database for matching files. The groveler then compares any matching files with the file corresponding to the work item for an exact duplicate, and if found, calls a single instance store facility to merge the files and create independent links to those files.

41 Claims, 22 Drawing Sheets

METHOD AND SYSTEM FOR AUTOMATICALLY MERGING FILES INTO A SINGLE INSTANCE STORE

TECHNICAL FIELD

The invention relates generally to computer systems and data storage, and more particularly to identifying and merging files of a file system having common properties.

BACKGROUND OF THE INVENTION

The contents of a file of a file system may be identical to the contents stored in one or more other files. While some file duplication tends to occur on even an individual user's personal computer, duplication is particularly prevalent on networks set up with a server that centrally stores the contents of multiple personal computers. For example, with a remote boot facility on a computer network, each user boots from that user's private directory on a file server. Each private directory thus ordinarily includes a number of files that are identical to files on other users' directories. As can be readily appreciated, storing the private directories on traditional file systems consumes a great deal of disk and server file buffer cache space.

Techniques that have been used to reduce the amount of used storage space include linked-file or shared memory techniques, essentially storing the data only once. However, when these techniques are used in a file system, the files are not treated as logically separate files. For example, if one user makes a change to a linked-file, or if the contents of the shared memory change, every other user linked to that file sees the change. This is a significant drawback in a dynamic environment where files do change, even if not very frequently. For example, in many enterprises, different users need to maintain different versions of files at different times, including traditionally read-only files such as applications. As a result, linked-file techniques would work well for files that are strictly read-only, but these techniques fail to provide the flexibility needed in a dynamic environment.

Another problem with these techniques is that identifying identical files becomes a complex task as the number of files on a file system volume increases. For example, a disk drive may store thousands of files, and each time a new file is written to a disk or a file is changed, a potential for file duplication exists. At times a user may know when files are duplicates of one another, and thus can manually request that the file data be shared, however relying on a user to detect such conditions is unpredictable, and for large numbers of files, inefficient and/or impractical. One possible solution is to run a utility at system start-up that scans a file system's files for duplicates, however this solution becomes unacceptably slow even with only a few thousand documents. Moreover, such a solution would not work well for users who seldom reboot a machine. Indeed, as more and more disk space is consumed, sharing files becomes a more valuable tool for preserving disk space, and thus a real-time solution could reclaim space when most needed. However, scanning even a relatively modest number of files in a file system volume for one or more duplicates, such as each time that a file is closed, consumes a great deal of time and machine resources, and thus is also impractical.

SUMMARY OF THE INVENTION

Briefly, the present invention provides a method and system for automatically identifying common files of a file system and merging those files into a single instance of the data, having one or more logically separate links thereto representing the original files. A groveler facility maintains a database of information about the files on a volume of a file system, the information for each file including a file size and checksum (signature) based on the file contents. The groveler includes a component that periodically acts in the background to scan the USN log, a log that dynamically records file system activity, whereby new or modified files detected in the USN log are queued as work items, each work item representing a file. The entire volume also may be scanned to add work items to the queue, which takes place initially when the queue is created, or when there is a potential problem with the USN log.

The groveler includes another component that periodically removes items from the queue, calculates the signature of the corresponding file contents, and uses the signature and file size to query the database for matching files. The groveler component then compares any matching files with the file corresponding to the work item for an exact duplicate, and if found, calls a single instance store facility to merge the files and create independent links to those files.

Other advantages will become apparent from the following detailed description when taken in conjunction with the drawings, in which:

DETAILED DESCRIPTION OF THE INVENTION

Exemplary Operating Environment

Figure 1:
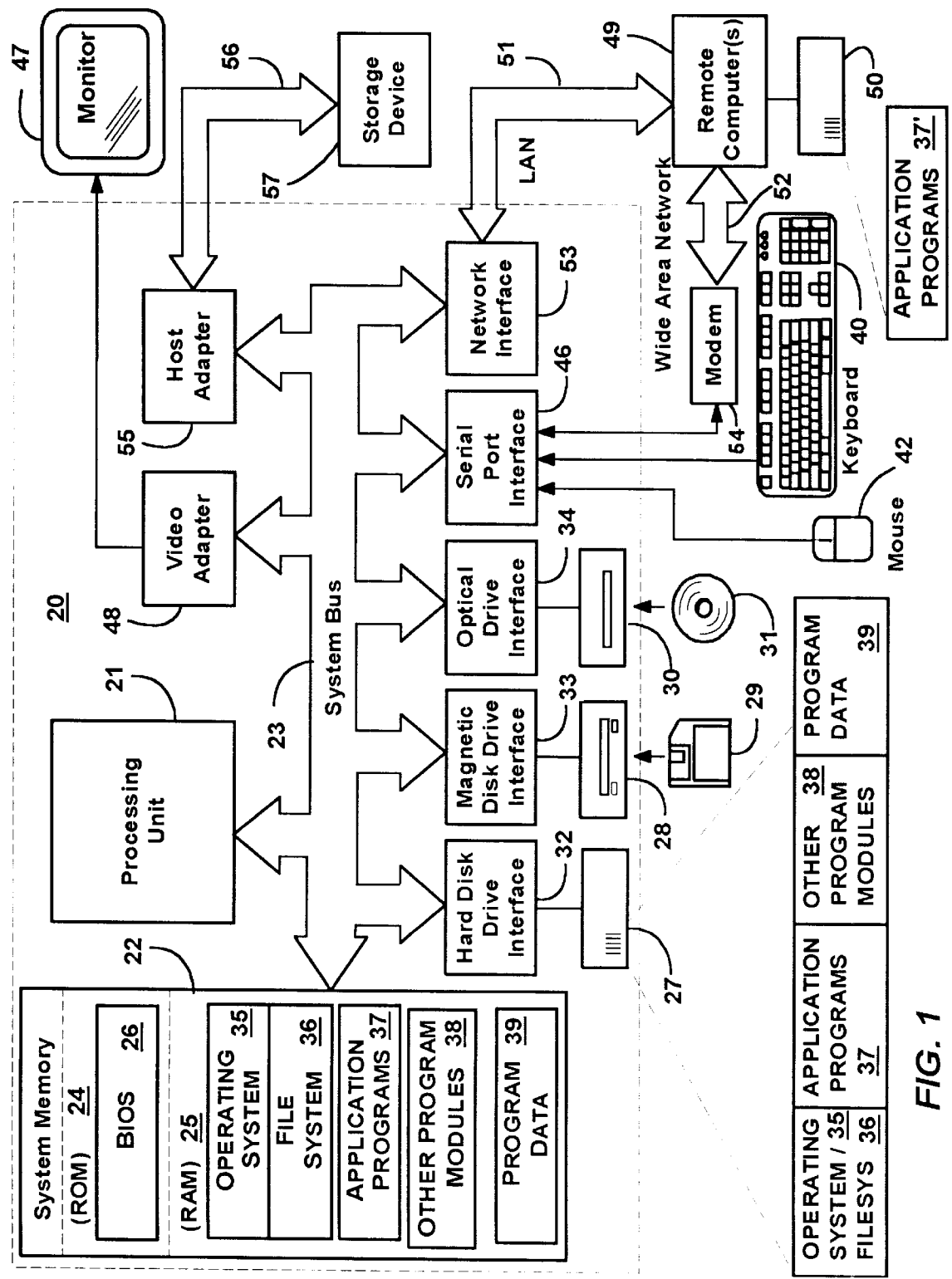
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that are accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows® 2000). The computer 20 includes a file system 36 associated with or included within the operating system 35, such as the Windows NT® File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The present invention is described herein with reference to Microsoft Corporation's Windows 2000 (formerly Windows NT®) operating system, and in particular to the Windows NT® file system (NTFS). Notwithstanding, there is no intention to limit the present invention to Windows® 2000, Windows NT® or NTFS, but on the contrary, the present invention is intended to operate with and provide benefits with any operating system, architecture and/or file system.

The Groveler

Figure 2A:
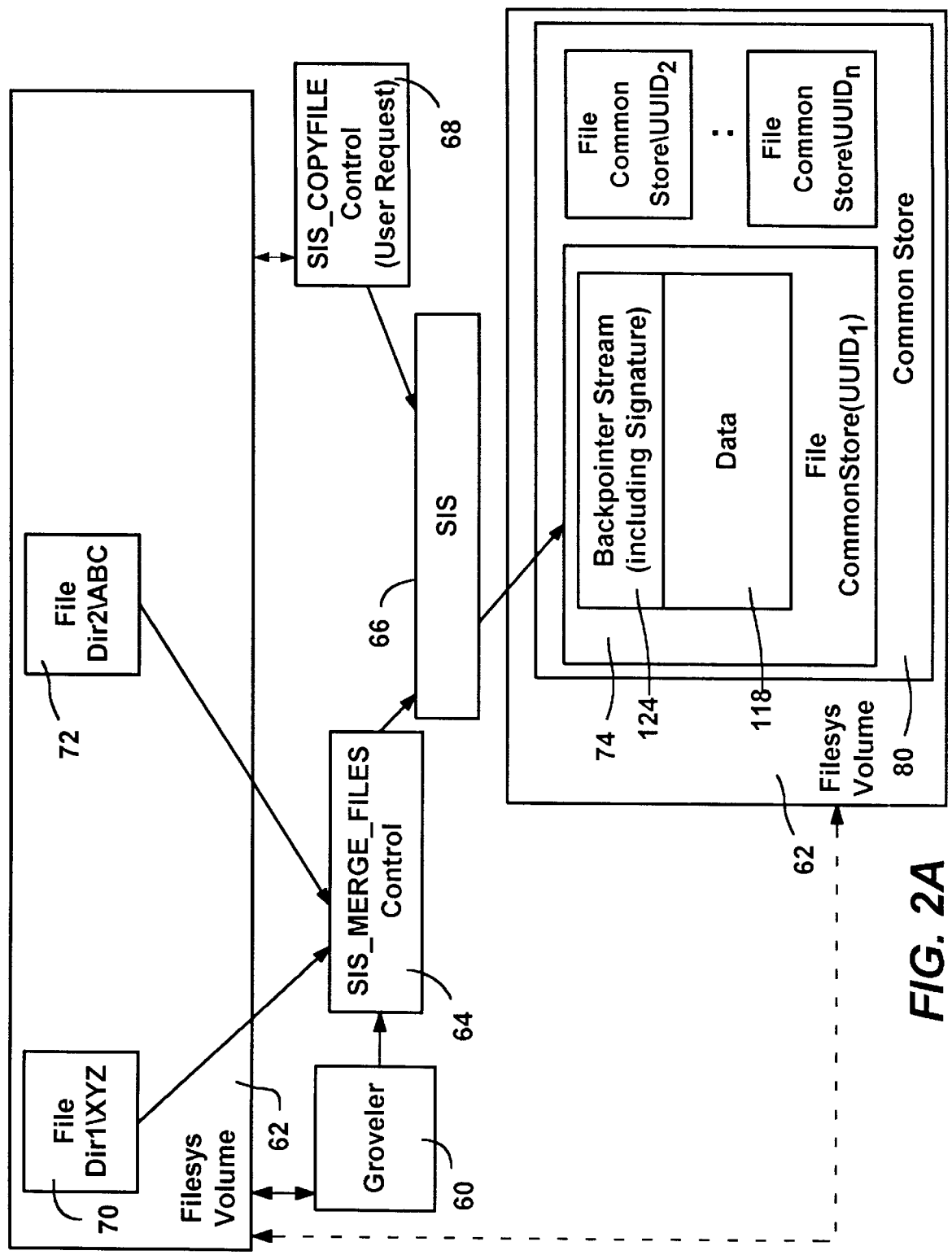
FIGS. 2A–2B are block diagrams representing various components for working with single instance store (SIS) link files and SIS common store files, including the automatic identifying and merging of duplicate files in accordance with an aspect of the present invention.
Figure 2B:
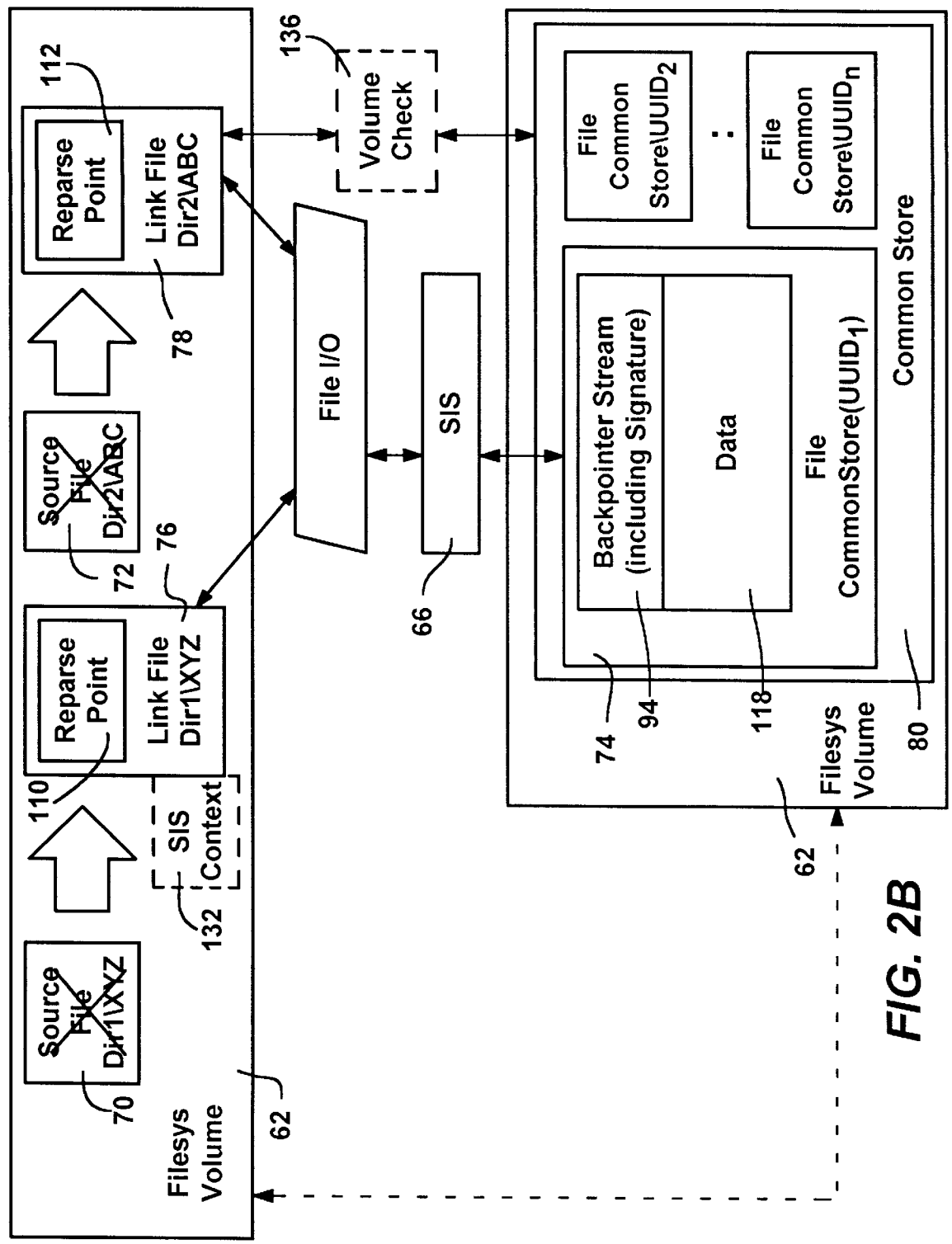

Turning now to FIGS. 2A–2B, there is shown a general concept of a groveler 60 and a single instance store (SIS) facility and architecture underlying a preferred implementation of the present invention, which may be implemented in the computer system 20. In accordance with one aspect of the present invention and as described in detail below, as represented in FIG. 2A, in general, the groveler 60 finds files having duplicate data in a file system volume 62. Via a file system control named SIS_MERGE_FILES 64, the groveler 60 calls the Single Instance Store (SIS) facility 66 to merge the duplicate files into a single instance of data with links thereto. The SIS_MERGE_FILES control 64 may be implemented as a Windows 2000 file system control, recognized by the SIS facility 66. One such (SIS) facility 66 is described below, and is further described in copending United States Patent Application entitled "Single Instance Store for File Systems," assigned to the assignee of the present invention, filed concurrently herewith, and hereby incorporated by reference herein in its entirety. Note that alternatively, a user, via a SIS_COPYFILE request 68 to the SIS facility 66, may explicitly (manually) request that a source file be copied to a destination file as a SIS copy of the file.

As shown in FIGS. 2A and 2B, the groveler 60 finds, for example, that files 70, 72 (named Dir1\XYZ and Dir2\ABC) have duplicate data. Note that the files may be in separate directories of the volume 62 or in the same directory. When such duplicate files 70, 72 are identified, the groveler 60 calls the SIS facility 66 via the SIS_MERGE_FILES control request 64. As described below and as generally shown in FIG. 2B, the call to the SIS facility 66 normally results in a single instance representation 74 of the original files 70, 72 with links 76, 78 thereto, each link corresponding to one of the original files, e.g., the user sees each link file as if it was the original file. The common store file 74 is maintained in a common store directory 80 of such files.

Each SIS link file 76, 78 is a user file that is managed by the SIS facility 66, while the common store 80 is preferably a file system directory that is not intended to be visible or accessible to users. Note that the single instance representation 74 need not actually be a file system file in a file system directory, but may be stored in some other data structure. Thus, as used herein, the link file, common store file and/or single instance file components are intended to comprise any appropriate data structure that can hold at least part of a file's contents. Notwithstanding, the link files 76, 78 may be maintained on the same file system volume 62, as is the common store file 74 and the common store directory 80. This enables removable media to take the links and common store with it when removed, prevents formatting one volume (e.g., D:) from losing the common store file or links of another volume (e.g., C:), and so forth.

Repeating the SIS_MERGE_FILES (and/or SIS_COPYFILE) processes for any other files that have the same data will add links without substantially adding to the single instance of the file. In this manner, for example, an administrator user of a file server may place the links for many client users on each user's private directory, while maintaining only one instance of the file on the server. Note that it is feasible to have a SIS common store file with only one link thereto, while alternatively, a control may be implemented that allows more than two files to be specified at the same time for merging into a single instance representation thereof. As also described below, it also may occur that the groveler 60 detects a file (that is not a SIS link file) but already has a single instance representation of its data in the common store directory 80. In such an instance, the non-SIS link file may be converted (as described below) to a link to the existing single instance file.

Figure 3:
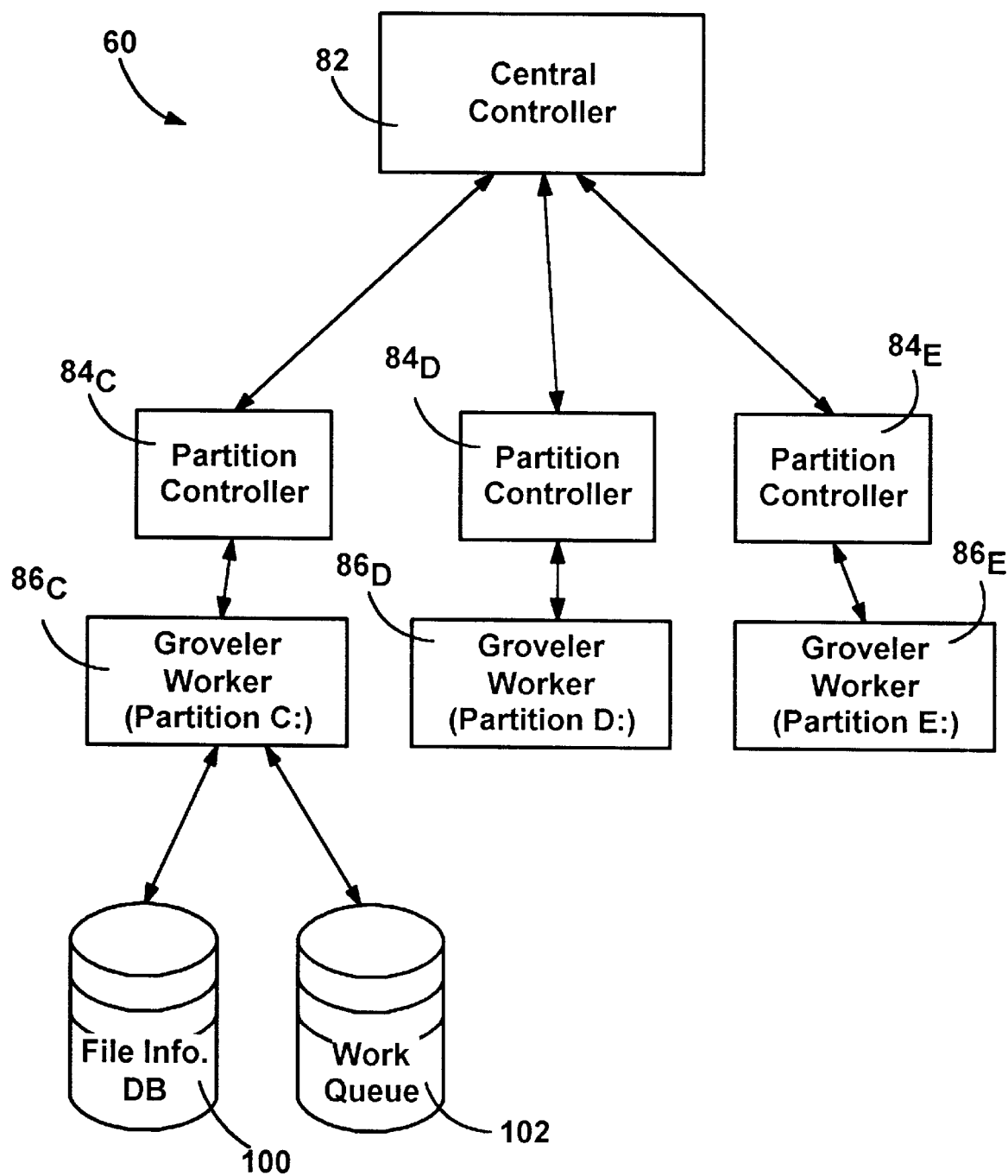
FIG. 3 is block diagram representing various components of a groveler for automatically identifying duplicate files for merging, in accordance with an aspect of the present invention.
Figure 4:
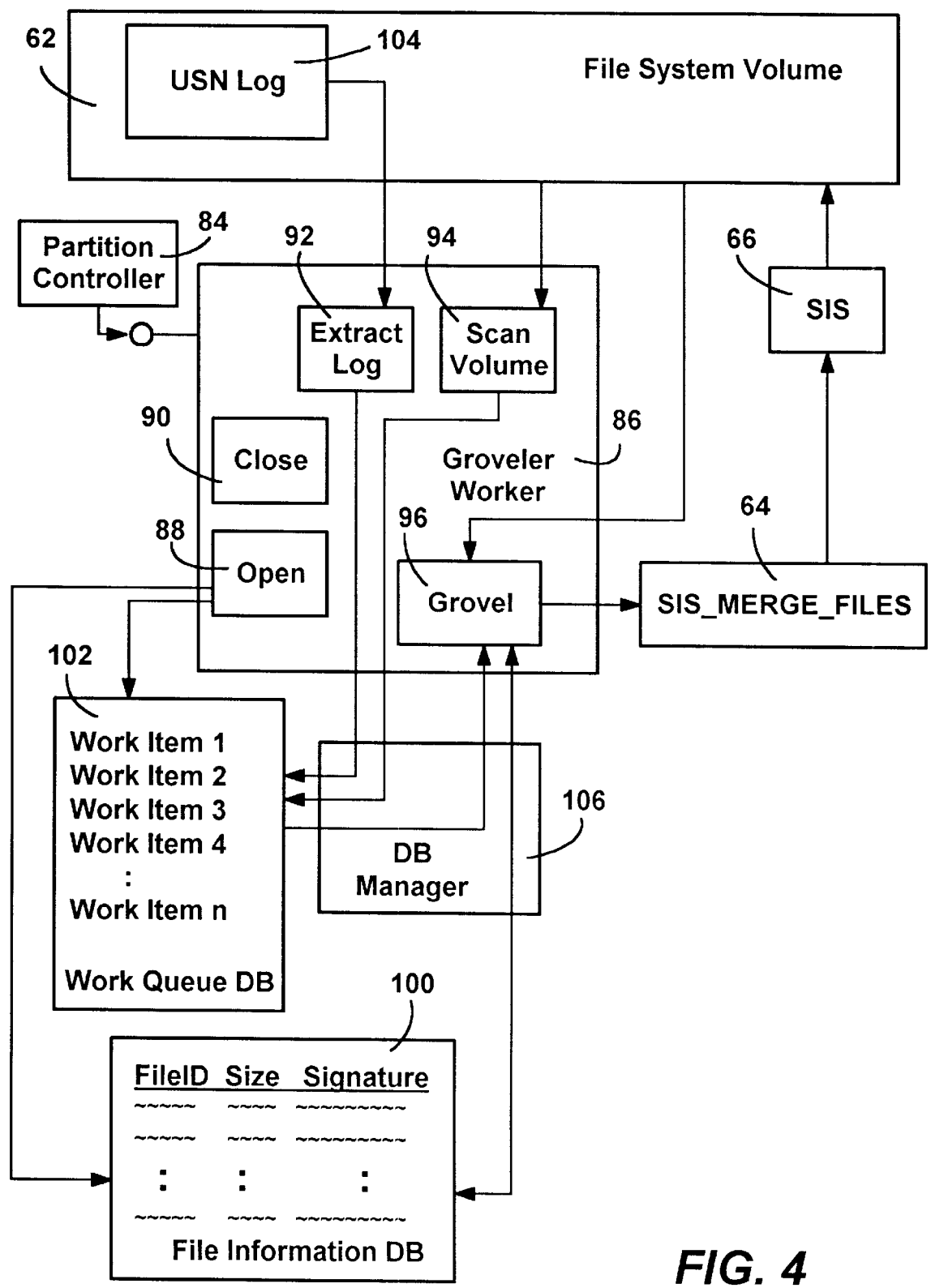
FIG. 4 is block diagram representing various components connected to a groveler worker object of FIG. 3.
Figure 5:
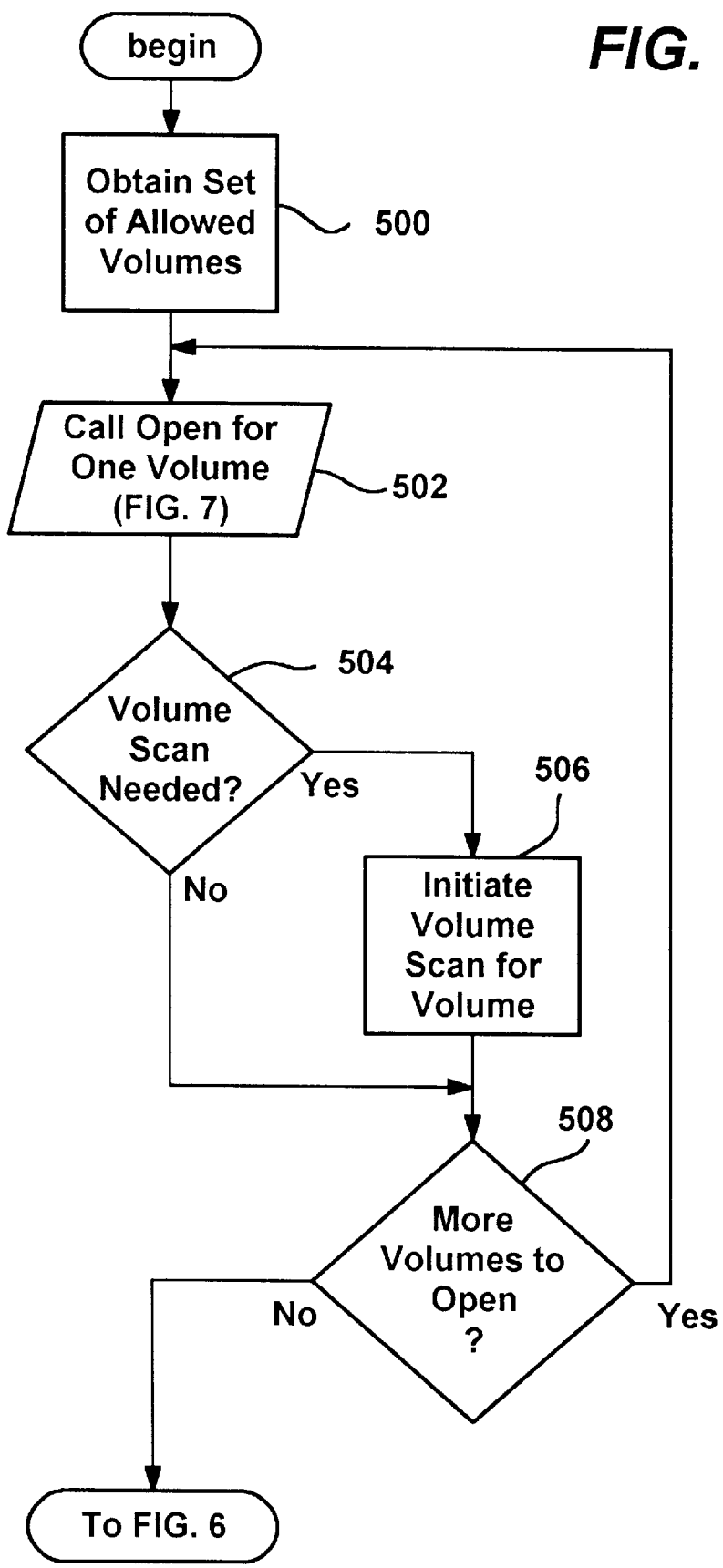
FIGS. 5 and 6 comprise a flow diagram generally representing the steps taken to call functions of a groveler worker to automatically identify and merge duplicate files in accordance with one aspect of the present invention.

In accordance with one aspect of the present invention and as generally represented in FIG. 3, to accomplish detection of duplicate files for merging purposes, the groveler 60 includes a central controller 82, preferably implemented as an instantiated object (e.g., a C++ object) with one or more defined interfaces thereto. The central controller 82 regulates the operation of one or more partition controllers $84_C$–$84_E$, (three are shown in FIG. 4), one partition controller per file system volume. In turn, the partition controllers $84_C$–$84_E$ each have a groveler worker $86_C$–$86_E$ associated therewith that when activated, individually attempt to identify duplicate files in their corresponding file system volume.

The central controller 82 synchronizes the operation of the partition controllers $84_C$–$84_E$ across multiple volumes, for example, such that only one runs at a time depending on available system resources. In turn, when allowed to operate, each partition controller $84_C$–$84_E$ calls functions of its corresponding groveler worker $86_C$–$86_E$.

As represented in FIG. 4, each groveler worker 86 is a single process, and includes an open function 88, close function 90, extract log function 92, scan volume function 94 and grovel function 96. In general, calling the open function 88 causes the groveler worker 64 to open (or create if needed) a database 100 of file information and a queue 102 of work items, also conveniently stored as a database. The close function 90 takes care of any cleanup operations before the groveler worker is shut down.

The extract log function 92 uses a USN (Update Sequence Number) log 104 to add items (file identifiers) to the work item queue 102. As is known, the USN log 104 is a function of the underlying NTFS filesystem 130 that dynamically records changes to a file system volume's files by storing change information indexed by a monotonically increasing sequence number, the USN. The extract log function 92 reads records from the USN log 104, each time starting from where it previously left off (as tracked by recording the USN), filters out those records that do not deal with new or modified files, and adds items to the work item queue 102 that correspond to new or modified files.

Calling the scan volume function 94 places work items (file identifiers corresponding to files in the volume) into the work item queue 102 via a depth first search of the file system volume 62. The scan volume function 94 is time limited, whereby when called, it places as many files as possible into the work item queue 102 within its allotted time, and resumes adding files from where it left off when called again. Note that the scan volume function 94 may be given some filtering capabilities, e.g., such that it will not add common store files to the work item queue 102, however at present the scan volume function 94 merely adds file identifiers as items to the work item queue 102 and any filtering is performed when work items are dequeued. The scan volume function 94 is called only when needed, e.g., when the work item queue 102 is first created, or if a problem occurs with the USN log 104 or the database 100, since the extract log function 92 may not be provided with the proper file change information.

The grovel function 96 removes items from the work item queue 102, and processes each removed item to determine if it meets some criteria, e.g., whether the file corresponding to that work item has a duplicate file in the volume 62. To this end, the grovel function 96 computes a checksum (signature) from the file's data, and queries the file information database 100 via a database manager 106 (including a query engine) to see if one or more files in the volume have the same checksum and file size. At the same time, the database manager 106 updates the file information database 100 as needed with the file information, e.g., adds new records or changes existing records by storing or modifying the file size and signature indexed by the file ID in the database 100. If at least one matching file is found, the grovel function 96 performs a byte-by-byte comparison with the matching file set to determine if one of the files is an exact duplicate, and if exact, calls the SIS facility 66 via the SIS_MERGE_FILES control 64 to merge the files. In this manner, duplicate files are automatically identified and combined in a rapid manner.

Turning to an explanation of the present invention with particular reference to the flow diagrams of FIGS. 5–9, the groveler 60 begins at step 500 when the central controller 82 determines which of the volumes are allowed to be groveled. A preferred way to determine when and how to run a background process (such as the way in which the groveler 60 is typically run) uses a technology sometimes referred to as "back off technology," that measures the actual performance of background tasks, including the performance of input/output (I/O) operations. The measurements are used to statistically determine when the background process is likely degrading the performance of a foreground process, in which event the background process temporarily suspends its execution, i.e., backs off. As a result, certain volumes may be too busy to grovel, for example, or locked by a disk utility, whereby only a subset of the total number of volumes may be groveled at a given time. Such back off technology is described in copending United States Patent Application entitled "Method and System for Regulating Background Tasks Using Performance Measurements," filed concurrently herewith, assigned to the assignee of the present invention and hereby incorporated by reference herein in its entirety. Notwithstanding, virtually any mechanism including CPU scheduling priority may be used to determine when to execute the groveler 60 on a volume, and moreover, the groveler 60 may be periodically run as a foreground process.

Once the set of volumes that can be groveled is determined at step 500, the open function of the groveler worker (e.g. object 86) is called at step 502 for one of the volumes, and as represented by step 508, is repeated for each volume. Note that although not shown, the groveler worker (object) 86 is instantiated (if not already instantiated) before calling its functions. For each volume, if at step 504 the result of the open call indicates a volume scan is needed, a scan is initiated at step 506 by setting a flag associated with the volume. After repeating this process via step 508 for each volume of the set that can be groveled, a main loop (FIG. 6) is entered, as described below.

Figure 7:
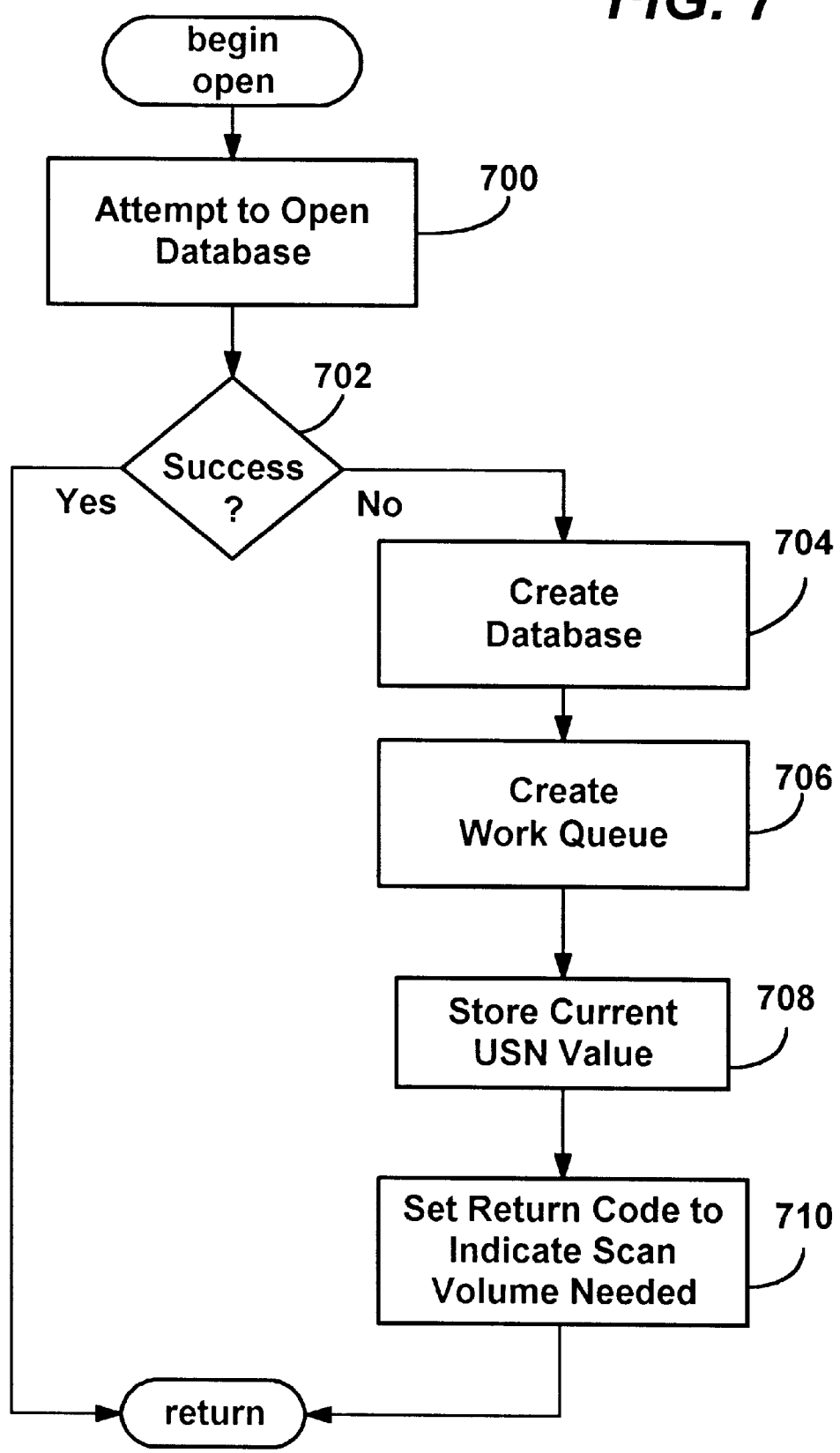
FIG. 7 is a flow diagram generally representing the steps taken by the groveler worker open function.

FIG. 7 shows the general operation of the open function 88 for a given volume, beginning at step 700 where the groveler worker 86 attempts to open the file information database 100. If not successful as detected by step 702, the groveler worker 86 creates a new database 100 at step 704 for the volume along with a new work item queue 102 at step 706. The groveler worker 86 also stores the volume's current USN value at step 708, and sets a return code at step 710 to indicate that the partition controller 84 needs to call the scan volume function 94 to begin filling the work item queue 102 with the volume's file identifiers as described above. The current USN number is stored so that the extract log function 92 will be able to handle any file changes that happen after the volume scan is started.

Figure 6:
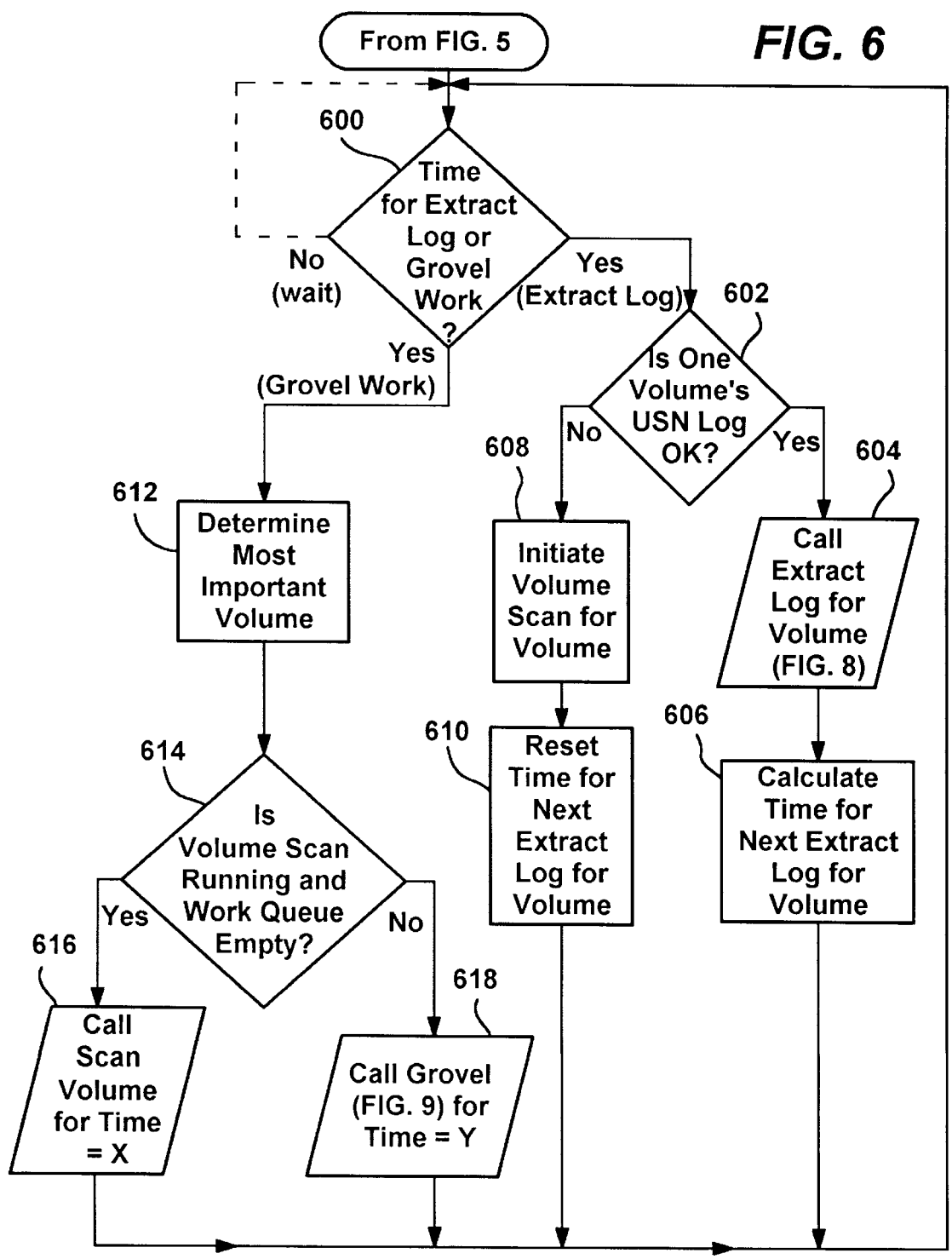

FIG. 6 shows the main loop for operating the groveler functions. In each pass of the loop, for each volume it is determined at step 600 whether it is time for an extract log function call, time to grovel, or neither. If it is time for neither function, the process waits until the appropriate time is achieved, as represented by the dashed line "looping" back to step 600. Note that the time to grovel a volume is regulated via the aforementioned back-off technology, and thus ordinarily varies with respect to the activity of foreground processes so as to limit interference of the groveling operations therewith. Note that back-off technology also may vary the frequency of groveling based on other factors, such as to grovel more frequently when disk space is deemed low in an increased-priority effort to gain free space by merging files.

The extract log function 92 is called at a frequency that varies in an attempt to place a constant number of items in the work item queue per call, and thus the frequency of calling the extract log function 92 is based on the amount of file system volume activity taking place. For example, if disk activity is at a high rate, a large number of USN records will be extracted from the USN log 104, whereby the extract log function 92 will likely add a larger number of items to the work item queue 102 relative to times of slow disk activity. By using the number of records extracted during the most recent extract log function call to determine the time duration before the next call, a high number of extracted records will cause a higher rate of calling extract log, while a lower number will cause a lower rate of calling. Over a period of time, the changes to the rate of calling roughly provide the desired number of items being placed in the work item queue 102 per call. Note that the rates may be adjusted gradually to smooth out any abrupt changes in disk activity. This is done to trade off the expense of draining the USN log too frequently against the possibility that the log will overflow and force a potentially very expensive scan volume.

If it is time for the extract log function for any volume (e.g., the volume 62), the USN log for that volume 62 is checked at step 602 to determine whether it is correct. Note that the USN log is typically of a fixed size, and so only keeps a fixed number of entries, corresponding to the most recent updates to the volume, i.e., older entries are discarded. If there are more volume updates than space in the USN log between times when the groveler worker 86 looks at the log, it will miss some volume updates, and the USN log will be deemed to be incorrect. The USN log will also be deemed to be incorrect if it is corrupted, for instance by a data error on the underlying disk.

If at step 602 the USN log 104 is not correct, step 602 branches to step 608 to initiate a scan volume operation for that volume as described above. Step 610 resets the time for performing the next extract log function, as also described above.

If it is time to call the extract log function (step 600) and the USN log 104 is correct (step 602), the extract log function 92 is called at step 604 (as described via FIG. 8) to place items in the work item queue 102 corresponding to the USN entries since the last recorded USN record that was processed.

Figure 8:
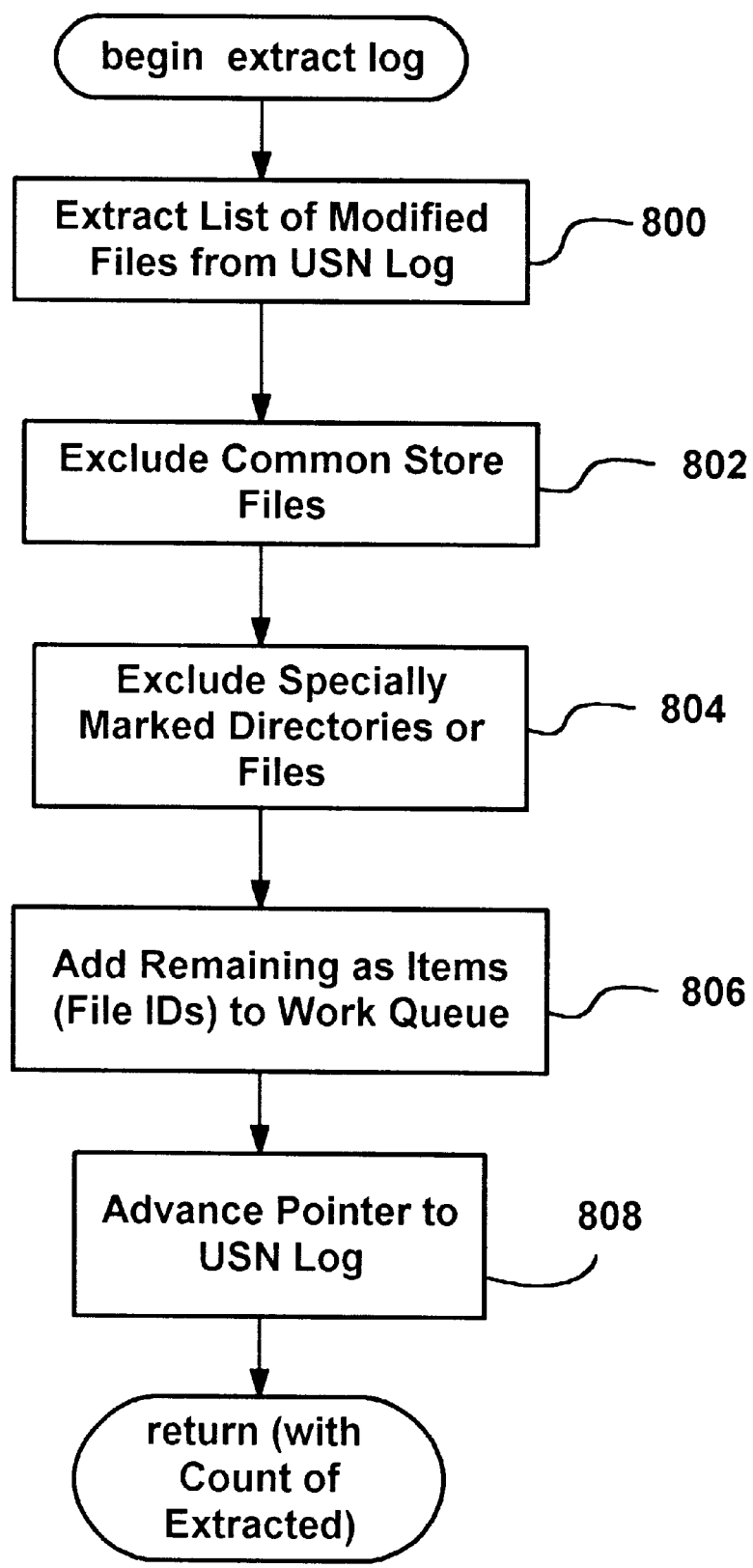
FIG. 8 is a flow diagram generally representing the steps taken by the groveler worker extract log function.

As represented in FIG. 8, the extract log function 92 begins by extracting a list of file identifiers corresponding to modified files from the USN log 104. Note that the application programming interface (API) or the like that allows the USN log 104 to be read may filter its return such that only selected types of files are returned, i.e., only those that are new or changed, and such that the same file is not listed multiple times. In addition, at step 802 the extract log function 92 may exclude certain files from the items to queue, such as common store files. For example, if a common store file is created from two identical files found by the groveler 60, appropriate entries will go into the USN log 104 to reflect this file system activity. These entries are flagged by the groveler 60 so that they are recognized and not again processed by the groveler 60. Alternatively, these items may be filtered out by the USN retrieval process (API). Also, it is possible that the user or system may choose to exclude certain files (e.g., on a per file or per directory basis) from automatic merging, essentially overriding the groveler 60 for selected files. If any such files are identified, these files are excluded at step 804.

At step 806, the remaining files are added as items to the work queue, identified by their volume-unique file identifier. At step 808, the extract log function 92 records the last USN handled so that the extract log function 92 will begin at the correct location the next time it is called. As described above, the extract log function 92 returns a count of the USN entries extracted, from which the partition controller 84 calculates (at step 606 of FIG. 6) the next time to call the extract log function 92. Steps 806 and 808 are handled as an atomic database transaction so that a system crash in the middle will not result in the pointer being updated without the items being added to the work queue.

Returning to FIG. 6, following the extract log call, the time for the next extract log is calculated at step 606, and the process loops back to step 600. After repeating the process until it is not the extract time for any volume, step 600 branches to step 612 where the central controller 82 and/or partition controllers (e.g., $84_C$–$84_E$) may determine which of the volumes is the most important to grovel relative to others. One criterion for determining relative importance includes how much free space is left on a volume. Additional criteria may include when the volume was last groveled and/or the results of that grovel operation, so that, for example, the same nearly-full volume is not always considered the most important, particularly if there are no files to merge thereon.

Once the most important volume is selected, if at step 614 a volume scan is in progress (has been initiated and not completed) and the work queue is empty, the scan volume function 94 of the groveler worker 86 is called to begin/continue a scan operation of the entire volume 62, i.e., to begin or continue filling the work item queue 102 with the volume's file identifiers as described above. The current USN number is stored so that the extract log function 92 will be able to handle any file changes that happen after the volume scan is started. As mentioned above, the scan volume operation is time limited, presently 200 milliseconds, although of course this time may be made variable. For example, the number of items actually queued per call may be returned by the scan volume function and used to determine the time duration for the next call.

If at step 614 a volume scan is not in progress, or if the work queue is not empty, the grovel function (FIG. 9) is called at step 618, after which the process returns to the main loop at step 600.

In the grovel function, as represented beginning at step 900, the first item is dequeued from the work item queue 102. More particularly, the work item queue 102 is conveniently maintained as a database and accessed by the database manager 106 using transactions, whereby each item is atomically handled or not handled. As a result, the work item is not considered removed until fully processed, whereby if a system failure (crash) occurs before complete processing, the work item is not lost. However, for purposes of simplicity herein, the work item may be considered dequeued at this time, and step 902 then tests whether the dequeued item corresponds to a file that is a candidate for merging. For example, some files are considered too small to be worthwhile merging, others may already be links or common store files, while others may include reparse points (described below) that make the file ineligible for SIS merging. If the file is not a SIS candidate, step 902 branches ahead to step 916 to determine if the time is expired for this call or if there are no more items to dequeue, whereby the grovel function 96 will end. If instead the file is a SIS candidate, step 902 branches to step 904 where the file has a checksum (signature) computed therefor comprising a hash function applied to selected blocks of data (e.g., a one four kilobyte block from one-third of the way into the file, and a second four kilobyte block from two-thirds of the way into the file). As described below, this signature is computed in the same way SIS computes a signature for link files, although the present invention does not depend on this in any way, and other signature algorithms may be employed. At step 906, the file information database 100 is queried via the database manager 106 to obtain a list of files that have the same file size and signature as the file corresponding to the currently dequeued item.

If any matching files are returned as determined by step 908, step 910 takes an item from the match list and fully compares each byte in the matching file with each byte in the file corresponding to the work queue item to determine if the files are exact duplicates. Note that although not shown, some optimizations may be employed. For example, if the database manager 106 retrieves any SIS link files as matching the signature and file size, those may be tested first, actually using the common store file data for the full comparison. This is generally preferable to using the link file or a normal file because the link or normal file might be in use, in which event the groveler would have to postpone the comparison. The common store file is not busy in this way, and thus does not manifest this behavior. Moreover, to avoid a performance impact on other processes via pollution of the disk buffer cache, file reads are non-cached. To avoid interfering with foreground processes via file locking conflicts, opportunistic locks are used by the groveler 60 when accessing a file, which temporarily suspend access to the file by another process until the groveler 60 can release it.

Figure 9:
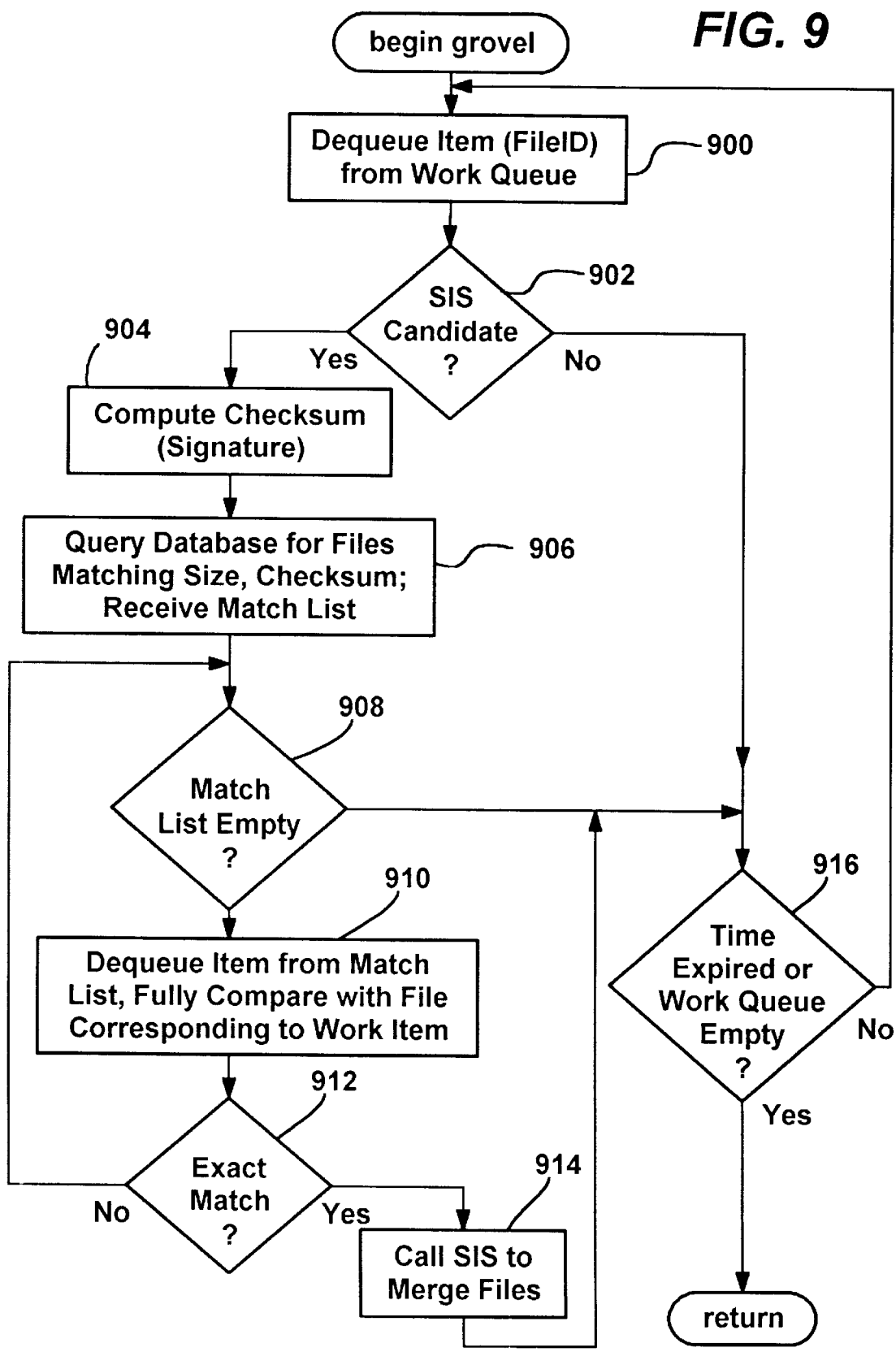
FIG. 9 is a flow diagram generally representing the steps taken by the groveler worker grovel function.

If at step 912 a potentially matching file does not match, the process continues until the match list is empty as determined by step 908 or until an exact match is found at step 912. The first exact match that is found ends the comparison, as a merge may then take place at step 914, as described below. As shown in FIG. 9, the grovel function 96 continues to dequeue items from the work item queue 102 until the work item queue 102 is empty or the time expires.

Following the calling of the grovel function 96 at step 618, the grovel function 96 may be called as many times as needed until the partition controller 84 is halted by the central controller 82, e.g., by a call thereto or by expiration of a time setting.

As can be readily appreciated, the partition controller 84 interleaves calls to the scan volume function 94, extract log function 92 and grovel function 96 while the scan volume operation is not complete. Once the scan volume operation is complete, the extract log function 92 and grovel function 96 are interleaved to respectively add items to the work queue 102 as files are created and/or modified, and remove those items from the queue 102 in search of duplicates. The interleaving of the scan volume function 94 that adds items to the work item queue 102 with the function that removes items from the work item queue (the grovel function 96) avoids the need to allocate a very large queue 102 for the many files possible in a file system volume 62. The extract log function runs to completion once it is started in order to prevent the USN log from overflowing and thus forcing an expensive scan volume process.

SINGLE INSTANCE STORE

The present invention has been described with reference to identifying duplicate files for merging into a single instance store with links thereto, and a system for performing the merging of duplicate files is described herein. However, as can be readily appreciated, the present invention may have numerous applications in identifying files with similar properties, not only files that are exact duplicates of one another. For example, the present invention may be used to find files that although not having exactly duplicated data, are very similar to one another, e.g., have differences below some threshold number of differences. A mechanism that commonly stored the similar data as a file, with separate links thereto along with the file deltas, may be alternatively utilized to combine file data.

Figure 12:
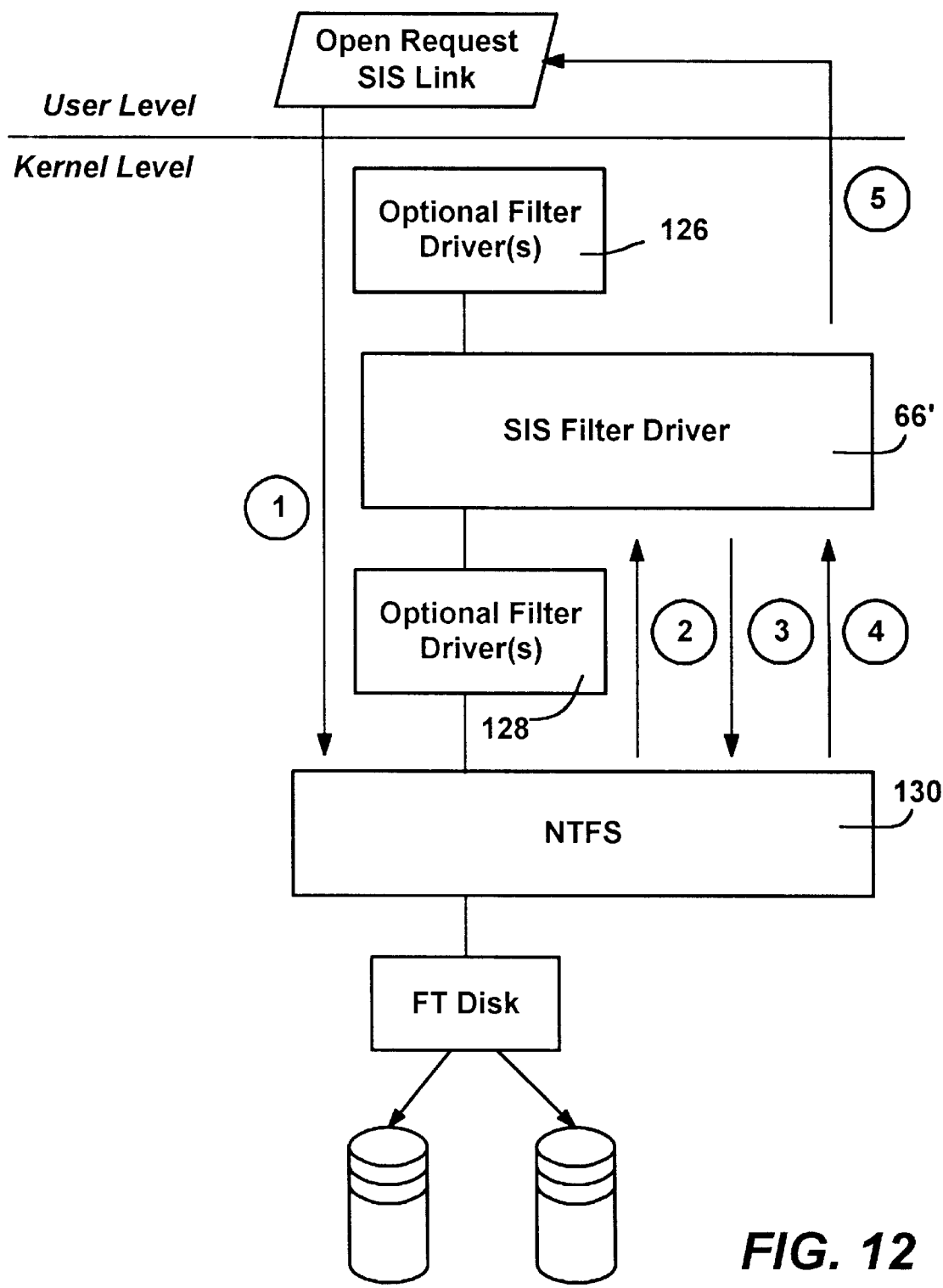
FIG. 12 is a representation of a SIS link file open request passing through a preferred SIS and file system architecture.

For efficiency, the SIS facility 66 may be built into the file system. However, although not necessary to the present invention, primarily for flexibility and to reduce complexity, it is preferable in the Windows 2000 environment to implement the SIS facility 66 as a filter driver 66' (FIG. 12). Indeed, the present invention was implemented without changing the Windows NT® file system (NTFS). Notwithstanding, it will be understood that the present invention as described above is not limited to the NTFS filter driver model.

In the NTFS environment, filter drivers are independent, loadable drivers through which file system I/O (input/output) request packets (IRPs) are passed. Each IRP corresponds to a request to perform a specific file system operation, such as read, write, open, close or delete, along with information related to that request, e.g., identifying the file data to read. A filter driver may perform actions to an IRP as it passes therethrough, including modifying the IRP's data, aborting its completion and/or changing its returned completion status.

The SIS link files 76–78 do not include the original file data, thereby reclaiming disk space. More particularly, the link files are NTFS sparse files, which are files that generally appear to be normal files but do not have the entire amount of physical disk space allocated therefor, and may be extended without reserving disk space to handle the extension. Reads to unallocated regions of sparse files return zeros, while writes cause physical space to be allocated. Regions may be deallocated using an I/O control call, subject to granularity restrictions. Another I/O control call returns a description of the allocated and unallocated regions of the file.

Figure 10:
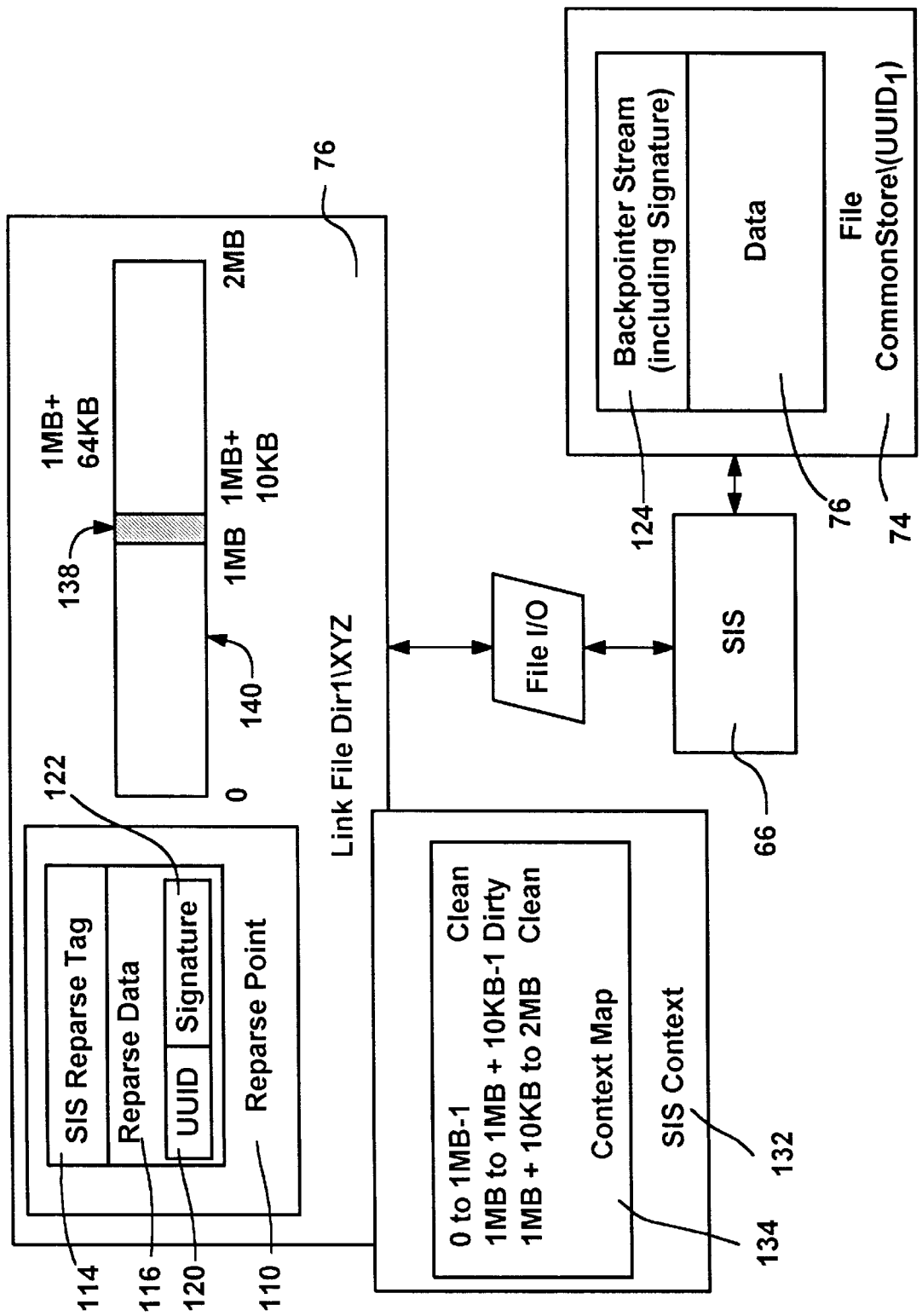
FIG. 10 is block diagram representing various components of a SIS link file and SIS common store file.

The link files 76, 78 include a relatively small amount of data in respective reparse points 110, 112, each reparse point being a generalization of a symbolic link added to a file via an I/O control call. As generally shown in FIG. 10, a reparse point (e.g., 110) includes a tag 114 and reparse data 116. The tag 114 is a thirty-two bit number identifying the type of reparse point, i.e., SIS. The reparse data 116 is a variable-length block of data defined by and specific to the facility that uses the reparse point 110, i.e., SIS-specific data, as described below.

Figure 11A:
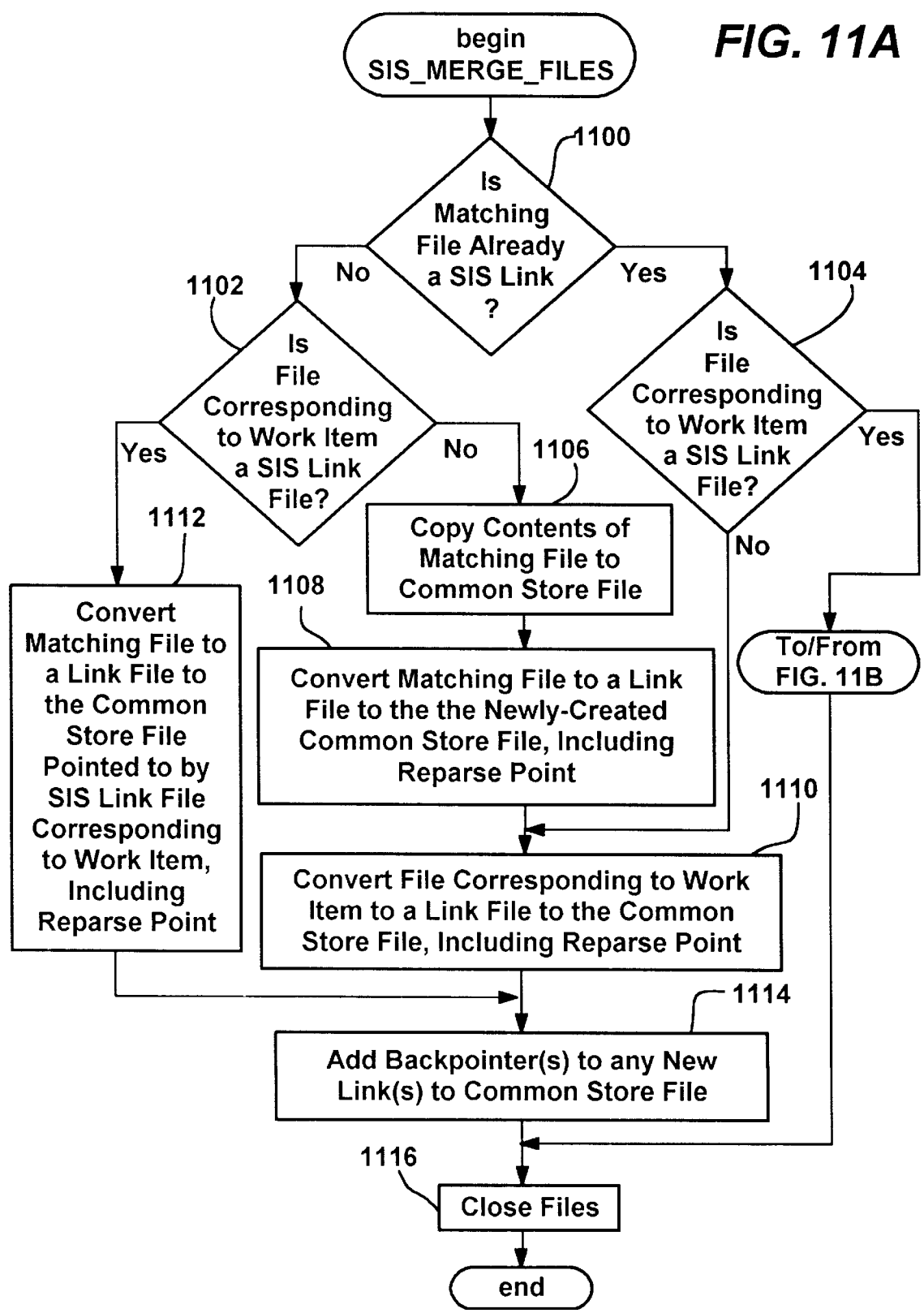
FIGS. 11A–11B comprise a flow diagram generally representing the steps taken to merge duplicate files into a SIS common store file.
Figure 11B:
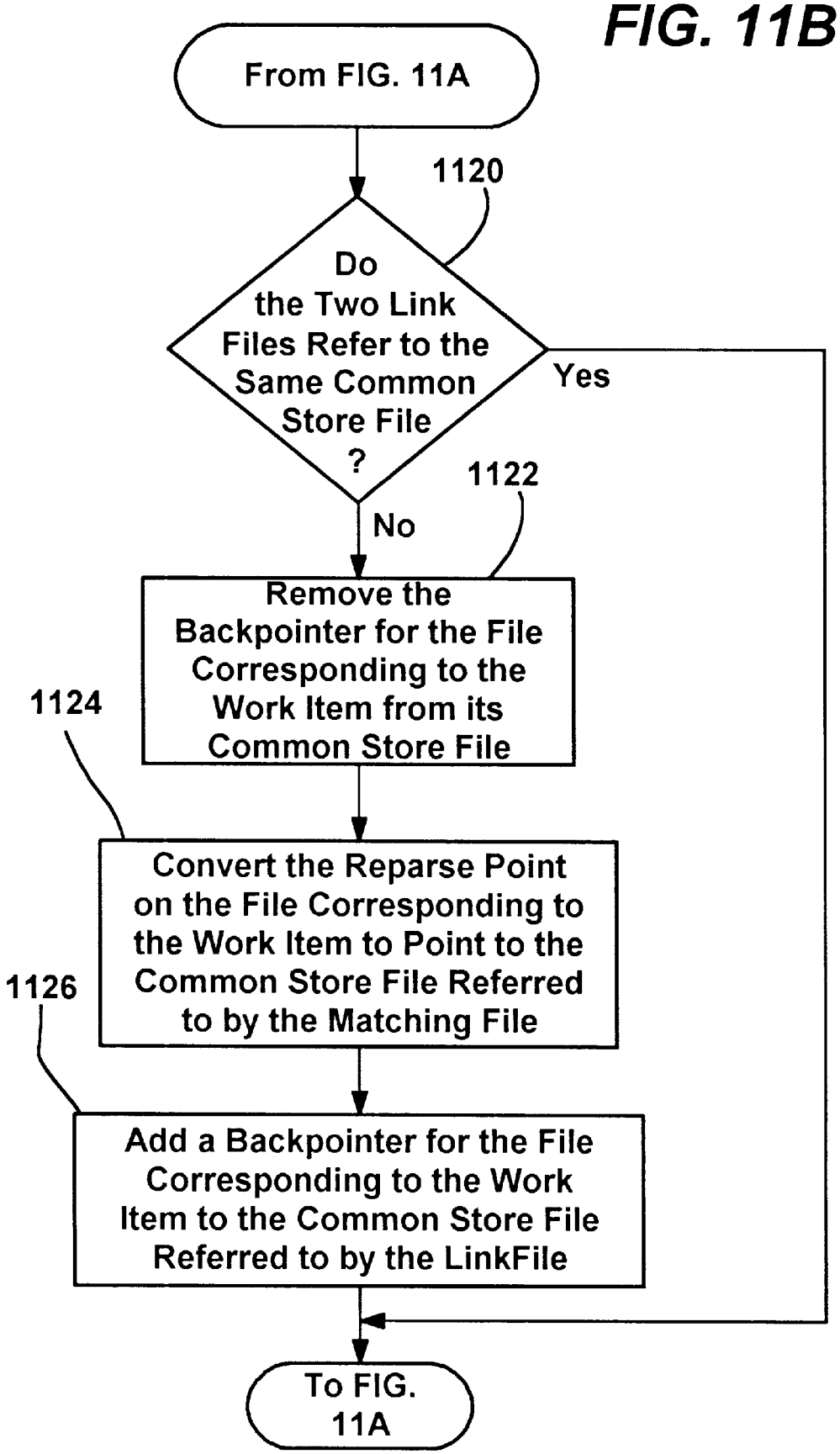

FIGS. 11A–11B represent the general flow of operation when the groveler 60 makes a SIS_MERGE_FILES control request 64 to SIS to merge duplicates files via the SIS driver 66'. The SIS driver 66' receives such requests, and at step 1100 determines whether the matching file is already a SIS link file. If the matching file is a SIS link file, step 1100 branches to step 1104 to handle the merge depending on whether the file corresponding to the work item is also a SIS link, as described below.

In the event that the matching file is not a SIS link, step 1100 branches to step 1102 to determine if the file corresponding to the work item is a SIS link. If not, step 1102 branches to step 1106 where the contents of the matching file are copied as file data 118 to a newly allocated file (e.g., 74) in the common store 80 (FIG. 2A). Note that for efficiency, SIS (and/or the groveler 60) may employ some threshold size test before making the copy. Further, note that SIS_MERGE_FILES control does an actual copy of the contents of the matching file to the common store 80 rather than a rename of the matching file. The link file representing the matching file thus maintains the file identifier (File ID) number originally assigned by the NTFS to the matching file, so that user open requests directed to the NTFS file ID are to the link file rather than to the common store file. This file ID number is used by SIS to identify the file, whereby any user-renaming of the link file by the user is not an issue. In an alternate embodiment, SIS could use rename in order to avoid copying the file data, possibly at the cost of having the source file's file ID change because of the copy operation, or by having support for a rename operation that leaves the file IDs unchanged in the underlying NTFS 130.

The common store file 74 in the common store 80 is named based upon a 128-bit universal unique identifier (UUID), shown in FIGS. 2A–2B as the file CommonStore\ (UUID$_1$). Using a UUID is particularly beneficial when backing up and restoring SIS files, since files with the same UUIDs are known to be exact copies, and more than one such copy is not needed in the common store 80.

While not shown in FIG. 11A, if a copying error occurs, the matching file remains unchanged, an appropriate error message is returned to the requesting user, and the SIS_MERGE_FILES control 64 is terminated. In the normal event where there are no errors in the copying process, step 1106 continues to step 1108 where the matching file is converted to a SIS link file (e.g., the link file 76, FIG. 2B).

To convert a file to a SIS link file at step 1108, the SIS_MERGE_FILES control 64 provides the reparse point 110, including the SIS tag 114, and reparse data 116 including the common store file's unique file identifier 120 and a signature 122 (FIG. 10). The signature 122 is a 64-bit checksum computed by applying a trinomial hash function (known as the 131-hash) to the file data. The common store file 74 maintains the signature therewith as part of a back-pointer stream 124, described below. The only way to determine the signature is via the file data contents, and thus the signature may be used to provide security by preventing unauthorized access to the contents via non-SIS created reparse points as described below.

As another part of the conversion to a link file 76 at step 1108, the data of the file is cleared out using the aforementioned NTFS sparse file technology. The resulting link file 76 thus essentially comprises the reparse point 110 and a shell for the data. At step 1110, the file 78 is created for the file corresponding to the work item in the same general manner, i.e., the link file 78 comprises a reparse point 112 having the same information therein and a shell for the data. Each link file is on the order of approximately 300 bytes in size.

Step 1114 represents the adding of identifiers of any new link files (converted via steps 1108 and/or 1110) to a backpointer stream 124 maintained in the common store file 74. As described in more detail below, the backpointers identify to the common store file 74 the link files that point to it. As also described below, backpointers are particularly useful in delete operations, i.e., delete the backpointer when the link file is deleted, but only delete the common store file when it has no more backpointers listed in the stream 124. At this time, the common store file 74 and the links 76, 78 thereto are ready for use as SIS files, and the files are closed as appropriate (step 1116).

Alternatively, if at step 1102 the file corresponding to the work item is already a SIS link file, there is no need to create another common store file to merge the files. Step 1102 thus branches to step 1112 where the matching file is converted to a link file as described above with reference to step 1108. Step 1112 then continues to step 1114 to add the backpointer of the link file converted from the matching file to the common store file, and then the files are closed as appropriate at step 1116.

Returning to step 1100, in the event that the matching file is a SIS link file, step 1100 branches ahead to step 1104 to determine if the file corresponding to the work item is also a SIS link file. If at step 1104 the file corresponding to the work item is not a SIS link, step 1104 branches to perform steps 1110–1116 to convert the file corresponding to the work item to a SIS link file in the manner described above. If instead the file already is a SIS link file, i.e., both files are SIS link files, step 1104 branches to step 1120 of FIG. 11B.

At step 1120 of FIG. 11B, the link files are evaluated to determine if they refer to the same common store file. If so, there is nothing to merge, and thus the process ends by returning to step 1116 (FIG. 11A) and closing any files as appropriate. If the two files do not refer to the same common store file, then the work item's corresponding file is converted to point to the common store file to which the matching store file points, and the corresponding common store files are appropriately modified. Note that this situation is possible if the user creates links by using the SIS_COPYFILE method.

More particularly, to properly handle the conversion of the work item's corresponding file and the fixup of the common store files, as represented by step 1122, the backpointer for the file corresponding to the work item is removed from its corresponding common store file. To adjust the file corresponding to the work item, the reparse point of this link file is converted to point to the common store file referred to by the matching file, as represented by step 1124. Also, as represented by step 1126, a backpointer to the file that corresponds to the work item is added to the common store file that is referred to by the matching link file. The process then returns to FIG. 11A to close the files as appropriate at step 1116.

Turning to FIGS. 12 and 13, there is provided an explanation of how a request to open a link file is handled by the SIS/NTFS architecture. As shown in FIG. 12, an open request in the form of an IRP, (including a file name of a file that has a SIS reparse point), as represented by the arrow with circled numeral one, comes in as a file I/O operation and is passed through a driver stack. The driver stack includes the SIS filter driver 66' with other optional filter drivers 126, 128 possibly above and/or below the SIS filter driver 66'. For purposes of the examples herein, these other filter drivers 126, 128 (shown herein for completeness) do not modify the IRPs with respect to SIS-related IRPs. At this time, the SIS filter driver 66' passes the IRP on without taking any action with respect thereto, as it is generally not possible to determine if a given filename corresponds to a file with a reparse point until NTFS processes the open request.

Figure 13A:
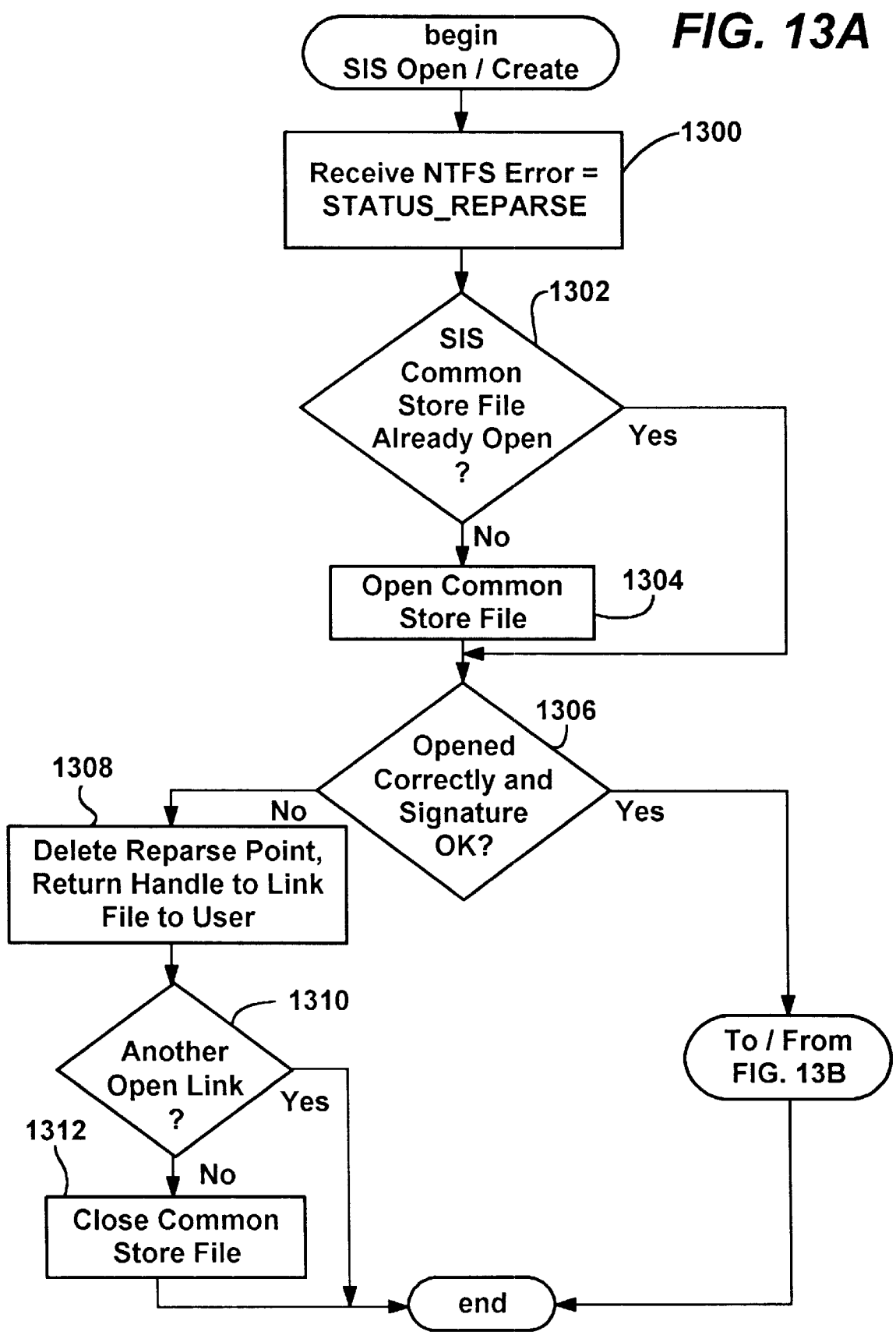
FIGS. 13A and 13B comprise a flow diagram generally representing the steps taken by the SIS facility to handle the open request represented in FIG. 12.
Figure 13B:
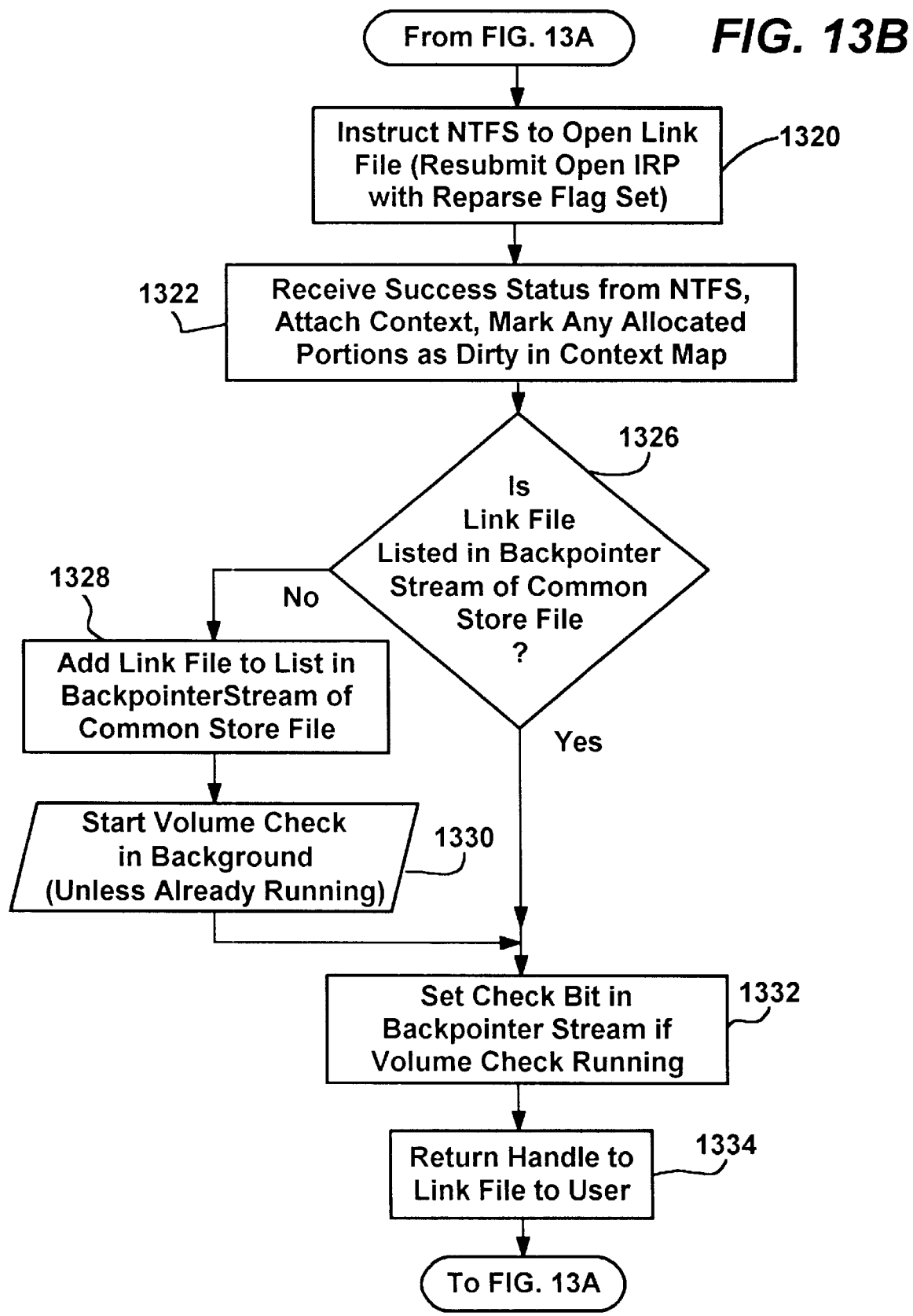

When the SIS link open IRP reaches the NTFS 130, the NTFS 130 recognizes that the file named in the IRP has a reparse point associated therewith. Without further instruction, the NTFS 130 does not open files with reparse points. Instead, the NTFS 130 returns the IRP with a STATUS_REPARSE completion error and with the contents of the reparse point attached, by sending the IRP back up the driver stack, as represented in FIG. 12 by the arrow with circled numeral two. As represented in FIG. 13A, at step 1300 the SIS filter 66' receives the STATUS_REPARSE error and recognizes the IRP as having a SIS reparse point.

In response, via steps 1302–1304, the SIS filter 66' opens the common store file 74 identified in the reparse point if the common store file 74 is not already open, and reads the signature therein. This is accomplished by the SIS filter 66' sending separate IRPs to NTFS 130 identifying the common store file by its UUID name 120 (FIG. 10) in the reparse point 110, and then requesting a read of the appropriate data. Then, at step 1306, if the open proceeded correctly, the SIS filter 66' compares the signature 122 in the reparse point with the signature in the backpointer stream 124 of the common store file 74. If they match, step 1306 branches to step 1320 of FIG. 13B as described below. However, if the signatures do not match, the SIS filter 66' allows the open to proceed by returning a file handle to the link file to the user, but without attaching SIS context to the opened file, essentially denying access to the common store file 74 for security reasons.

More particularly, a SIS reparse point may be generated external to SIS, including the UUID-based name of a common store file, a name which can be guessed in a relatively straightforward manner. As a result, without the signature check, such an externally-generated reparse point could give potentially unauthorized access to the common store file. However, since the SIS-reparse point has a signature, and the signature may only be computed by having access to the file data, only those who already have access to the file data can know the signature and provide a valid SIS-reparse point. The file data in the common store is thus as secure as the file data was in the original source file.

If the signature does not match at step 1306, step 1308 returns access to the link file without corresponding access to the common store file to the user. Step 1310 then tests to see if another link file has the common store file open, and if not, step 1312 closes the common store file 74. More particularly, SIS maintains a data object that represents the common store file, and the common store file data object keeps a reference count of open link files having a reference thereto. Step 1310 essentially decrements the reference count and checks to see if it is zero to determine whether it needs to close the common store file handle. Note that valid users are thus not stopped from working with their valid links to the common store file 74 if an invalid reparse point is encountered during the valid users' sessions.

If the signatures match at step 1306, at step 1320 the SIS filter driver 66' sets a FILE_OPEN_REPARSE_POINT flag in the original link file open IRP, and returns the IRP to the NTFS 130, as shown in FIG. 12 by the arrow with circled numeral three. This flag essentially instructs the NTFS 130 to open the link file 76 despite the reparse point. As shown in FIG. 12 by the arrow with circled numeral four, the NTFS 130 returns success to the SIS filter 66' along with a file object having a handle thereto (assuming the open was successful). At step 1322 of FIG. 13B, when the success is received, the SIS filter driver 66' attaches context 132 (FIG. 2B) to the file object, including a context map 134 (FIG. 10) that will be used to indicate any portions of the link file that have been allocated to data. Note that the context 132 is an in memory structure and only attached while the file is open, and is thus represented by a dashed box in FIG. 2B to reflect its transient nature. If the link file has any allocated data portions, those portions are marked in the map 134 in the context as "dirty" at step 1322. A link file having allocated data when first opened is a special case situation that occurs, for example, when the disk volume 62 was full, as described below.

At step 1326, a check is made to ensure that the link file's identifier is listed among the backpointers in the backpointer stream 124 of the common store file 74. It is possible for the list of backpointers in the stream 124 to become corrupted (e.g., when the SIS filter driver 66' is not installed) whereby the link file 76 is not listed. If not listed at step 1326, the link file's identifier, which is known to identify a valid link, is added to the list of backpointers 124 at step 1328, and a volume check procedure 136 (FIG. 2B) is started at step 1330 (unless already running). The volume check 136 essentially works with the backpointer streams of the various common store files ($UUID_1$–$UUID_n$) so that common store files do not contain backpointers to link files that do not exist, so that common store files do not remain and use disk space without at least one link pointing thereto, and so that each valid link file has a backpointer in the corresponding common store file. At step 1332, if volume check 136 is running, a check bit, used by the volume check 136, is set to one in the backpointer for the file each time that link file is opened. The volume check 136 and check bit are described in the aforementioned copending United States Patent Application entitled "Single Instance Store for File Systems."

At step 1334, the handle to the link file is returned to the user, shown in FIG. 12 by the arrow with circled numeral five. Note that the user thus works with the link file 76, and generally has no idea that the link file 76 links the file to the common store file 74. At this time, assuming the signature was correct and the opens were successful, the user has a handle to the link file 76 and the common store file 74 is open.

Writing to a SIS link file 76 does not change the common store file 74, since other links to the common store file 74 are logically separate. Instead, write requests are written to space allocated therefor in the link file 76, as described below. In this manner, changing the data via one link does not result in changes seen by the other links. Thus, by "logically separate" it is meant that in a SIS link, changes made to one link file are not seen by users of another link file, in contrast to simply having separate file names, protections, attributes and so on. If two users open the same link file, they will see one another's changes.

Figure 14:
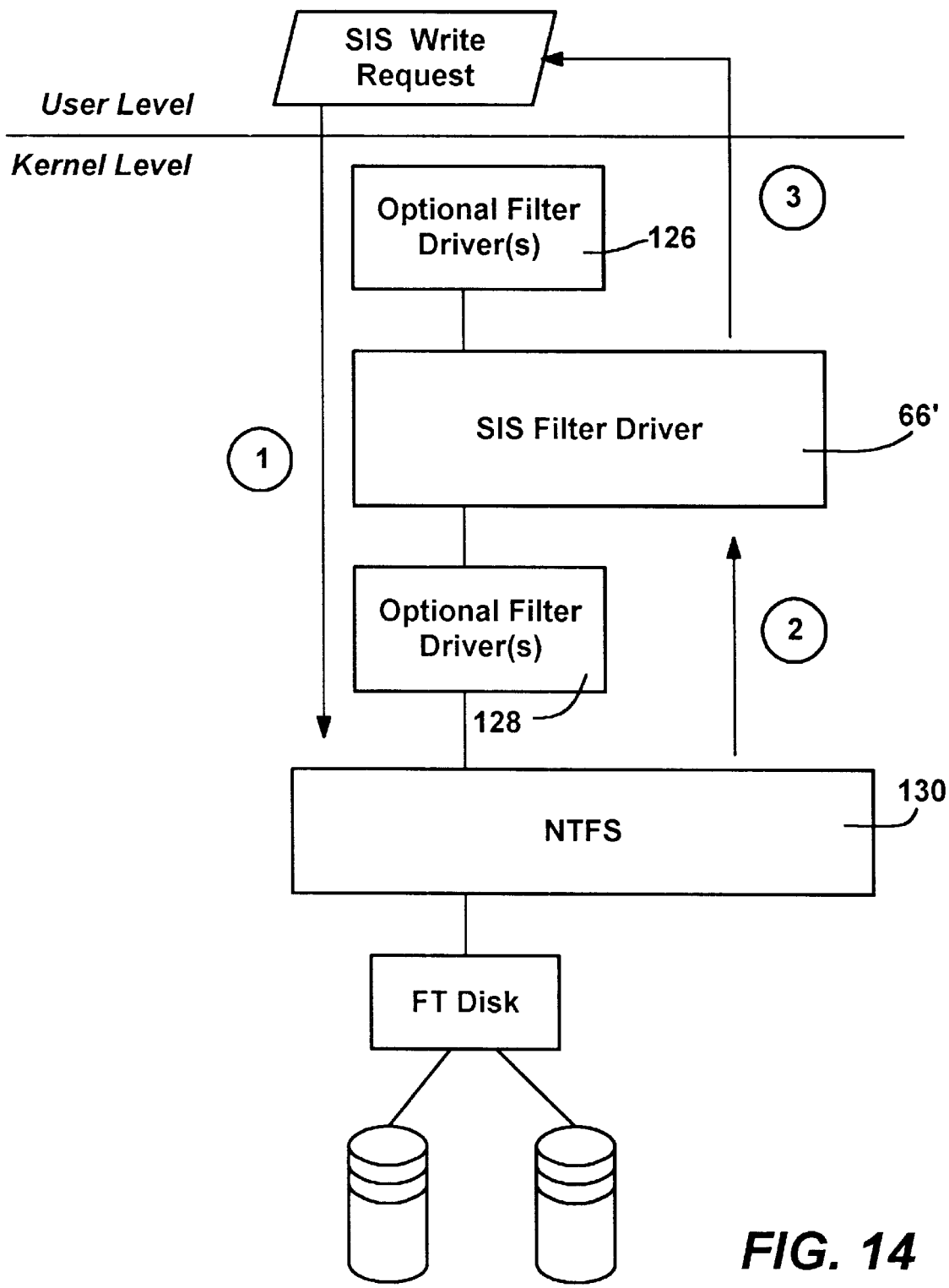
FIG. 14 is a representation of a SIS link file write request passing through a preferred SIS facility.
Figure 15:
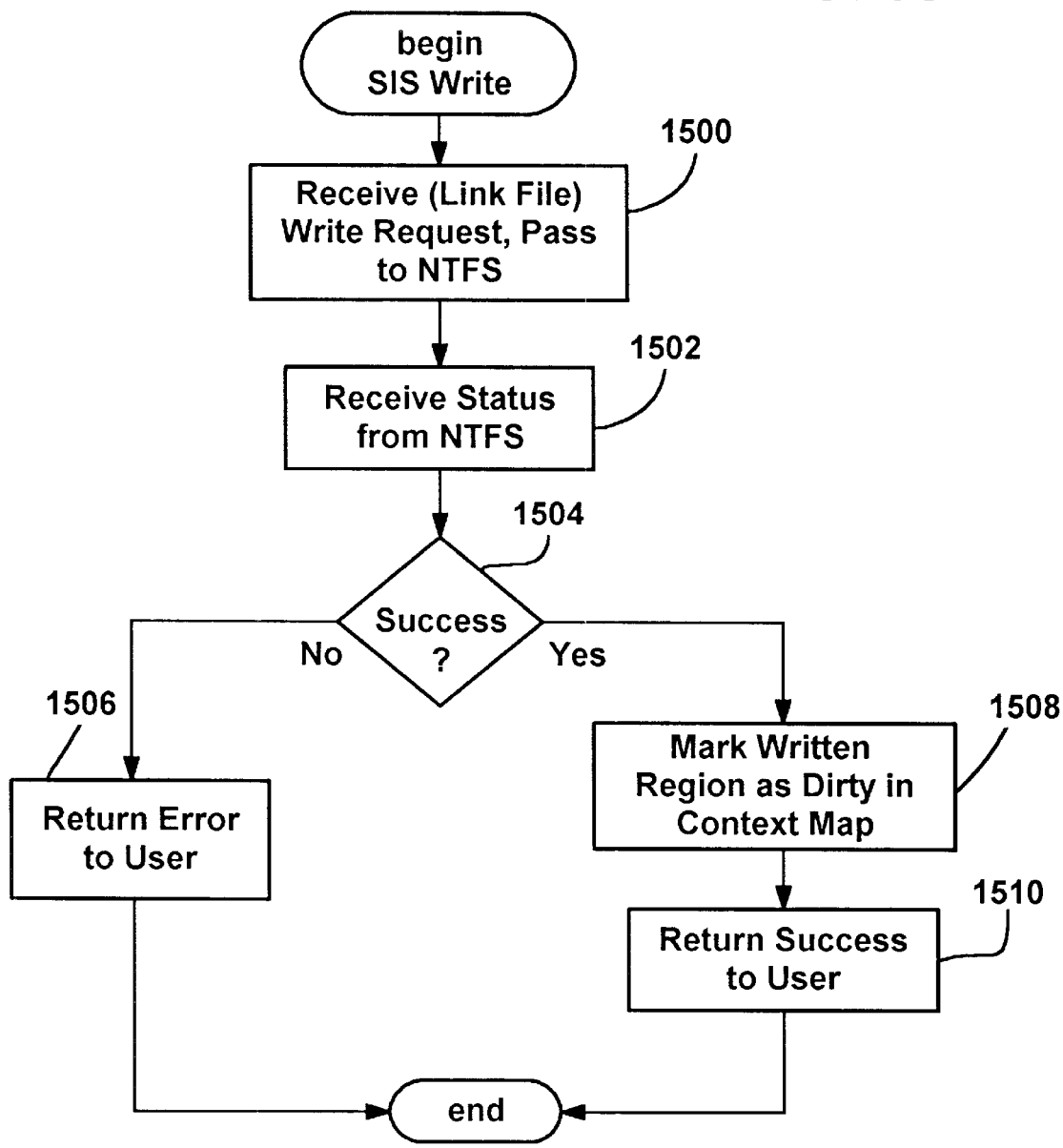
FIG. 15 is a flow diagram generally representing the steps taken by the SIS facility to handle the write request represented in FIG. 14.

FIGS. 14 and 15 describe how the SIS filter 66' handles a write request to the open link file 76. As shown in FIG. 14, the SIS write request comes through the driver stack to the SIS filter driver 66' as an IRP, including the file handle and attached context 132. The IRP designates the region of the file to be written and identifies the location of the data to write. The SIS filter driver 66' can recognize the context 132 as belonging to SIS, but because the write is directed to the link file 76, SIS lets the IRP pass to the NTFS 130 as shown in FIG. 14 by the arrow with circled numeral one and in FIG. 15 as step 1500. NTFS attempts the write, allocating appropriate space in the link file 76, and SIS receives a status from the NTFS at step 1502 (the arrow with circled numeral two in FIG. 14). If the write failed, e.g., the disk is full and the space could not be allocated, step 1504 branches to step 1506 where the error is returned to inform the user.

If the write was successful, step 1504 branches to step 1508 where the SIS filter driver 66' marks the region that was written as dirty in the context map 134 of the context 132, while step 1510 then reports the successful write status to the user. In this manner, SIS tracks which part of the file data is current in the common store file 74 and which part is current in the link file 76. By way of example, consider a user requesting to write ten kilobytes of data beginning at offset one megabyte, as generally shown in FIG. 10. The NTFS 130 allocates the space, unless already allocated, in the appropriate region 138 of the link file's (sparse) data space 140 (note that the NTFS actually allocates space in 64-kilobyte blocks). SIS then marks the context map 134 to reflect this dirty region, as shown in FIG. 10. Note that since the changes are not written to the common store file 74, the changes written to one link file are not seen by any other link to the common store file 74.

SIS thus lets NTFS 130 handle the allocation of the space in the sparse file and the writing thereto. However, if SIS is implemented in a file system that did not have sparse file capabilities, SIS could perform the equivalent operation by intercepting the write request and writing the data to a temporary file. Upon closing the "changed" link file, SIS only need copy the clean data from the common store file to the temporary file, delete the link file and rename the temporary file with the name of the link file to achieve the logical separation of files in a transparent manner.

Figure 16:
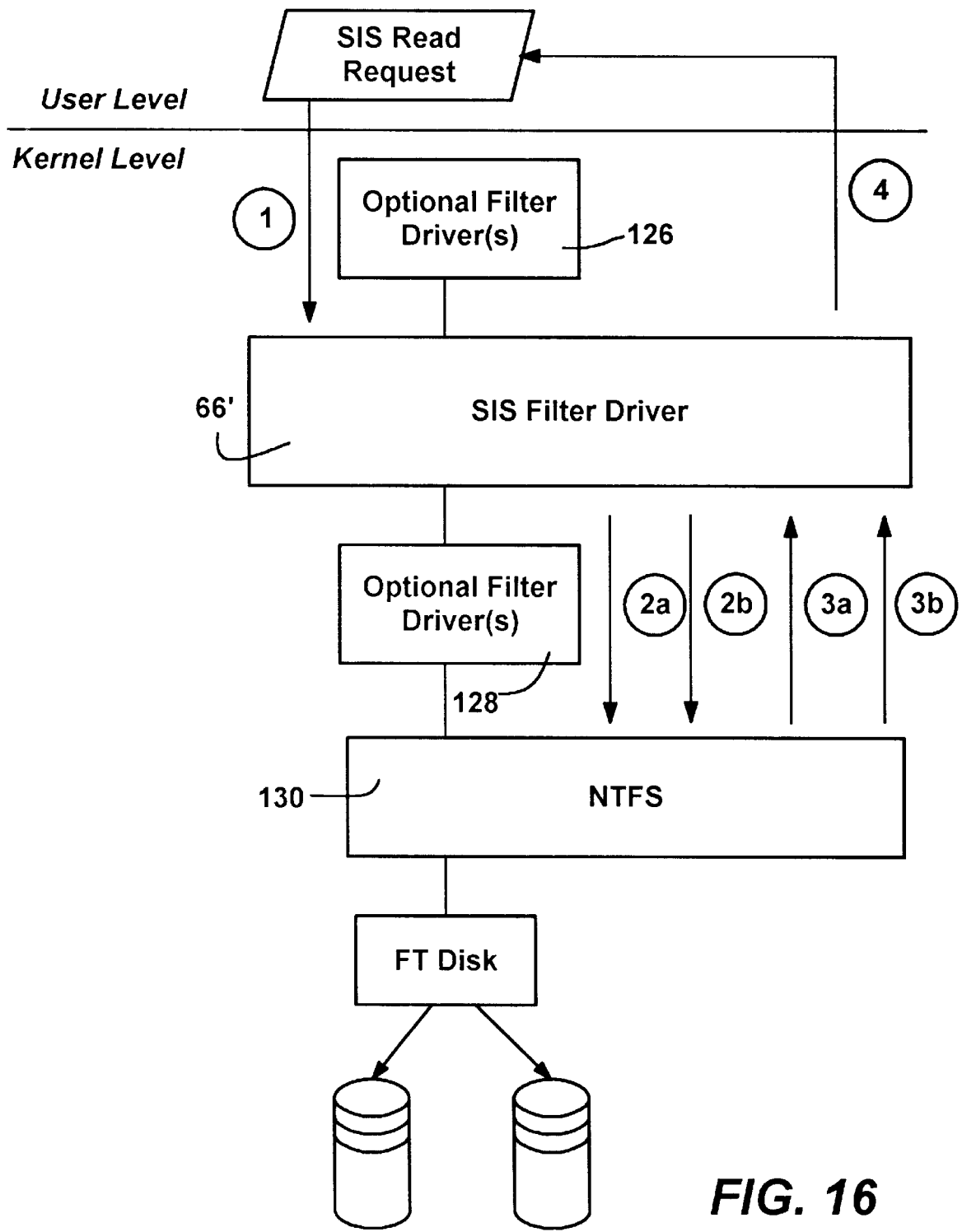
FIG. 16 is a representation of a SIS link file read request passing through a preferred SIS facility.
Figure 17:
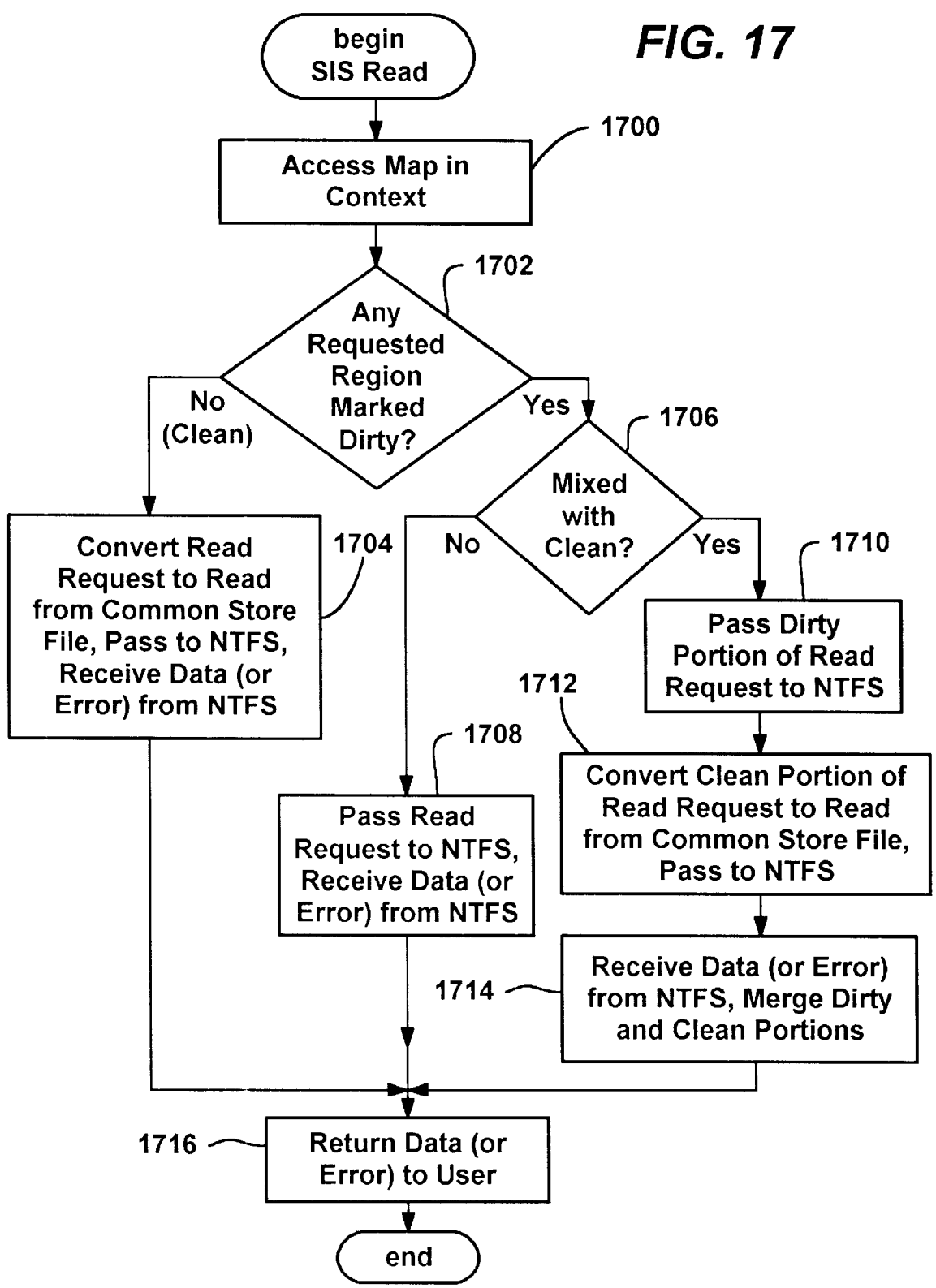
FIG. 17 is a flow diagram generally representing the steps taken by the SIS facility to handle the read request represented in FIG. 16.

FIGS. 16 and 17 describe how the SIS filter 66' handles a read request to the open link file 76. As shown in FIG. 16, the SIS read request comes through the driver stack to the SIS filter driver 66' as an IRP, including the file handle and attached context. The SIS filter driver 66' recognizes the attached context 132 as belonging to SIS, and intercepts the IRP, shown in FIG. 16 by the arrow with circled numeral one.

As shown in step 1700 of FIG. 17, the SIS filter driver initially examines the map 134 in the attached context 132 to determine if any of the link file is marked as dirty, i.e., allocated to file data. Step 1702 then compares the region that the IRP is specifying to read against the map 134, and if the read is to a clean region, step 1702 branches to step 1704. At step 1704, SIS converts the link file read request to a common store file read request IRP and passes the modified IRP to the NTFS 130 as also shown by the arrow accompanied by the circled numeral 2_a_ in FIG. 16. The NTFS 130 responds with the requested data (or an error) as shown in FIG. 16 by the arrow with circled numeral 3_a_. The data (or error) is then returned to the user at step 1716 of FIG. 17, (circled numeral 4 in FIG. 16). Note that to the user, the request appears to have been satisfied via a read to the link file, when in actuality the SIS filter 66' intercepted the request and converted it to a request to read from the common store file 74.

Returning to step 1702, it is possible that via a write operation to the link file, some of the data requested to be read is from a "dirty" region, that is, one that has been allocated and written to while the link file was open (or that was allocated on the disk when the link was first opened in step 1322). As described above, write requests cause space to be allocated in the link file 76 to provide an actual region to maintain the current state of the changed data. At step 1702, if a requested region to read is marked as dirty, step 1702 branches to step 1706 to determine if the entire read is from a dirty region or spans both dirty and clean regions.

If the entire region is dirty, then the SIS filter 66' passes the read request IRP to the NTFS 130 whereby the link file 76 is read at step 1708 and returned to the SIS filter 66'. This is represented in FIG. 16 by the arrows designated with circled numerals 2_b_ and 3_b_. The data (or error) is then returned to the user at step 1716 of FIG. 17, (circled numeral 4 in FIG. 16). In this manner, the user receives the current changes that have been written to the link file rather than the stale data in the common store file 74.

Alternatively, if step 1706 detects that the user is requesting both clean and dirty regions, the SIS filter 66' splits up the read request into appropriate requests to read the dirty region or regions from the link file 76 and the clean region or regions from the common store file 74. To this end, at steps 1710 and 1712, the SIS filter 66' uses the map 134 to generate one or more IRPs directed to reading the common store file 74 and passes at least one IRP directed to reading the link file 76 and at least one IRP directed to reading the common store file 74 to the NTFS 130. This is represented in FIG. 16 by arrows labeled with circled numerals 2a and 2b. Assuming no read errors, step 1714 merges the read results returned from the NTFS 130 (in FIG. 16, the arrows labeled with circled numerals 3a and 3b) into a single result returned to the user at step 1716 (the arrow labeled with circled numeral 4). Note that any read error will result in an error returned to the user, although of course SIS may first retry on an error. By appropriately returning the current data in response to a read request from either the common store file 74 or the link file 76, or both, SIS maintains the logical separation of the link files in a manner that is transparent to the requesting user.

Figure 18:
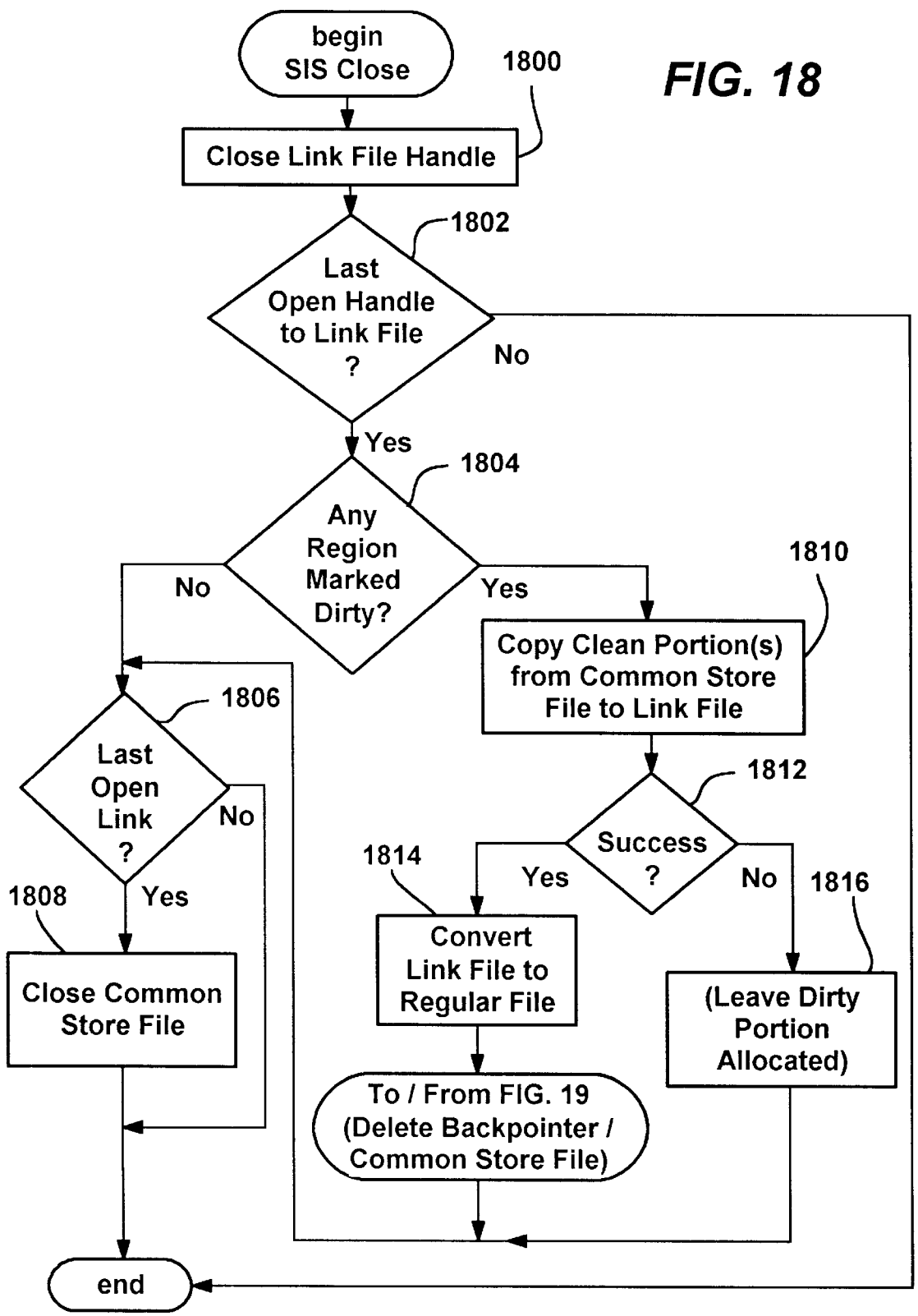
FIG. 18 is a flow diagram generally representing the steps taken by the SIS facility to handle a SIS link file close request.

FIG. 18 represents the steps taken when a request to close the handle to the link file 76 is received and the handle is closed at step 1800. At step 1802, a test is performed to see if this was the last handle currently open to this link file. If not, the process ends, whereby the link file is left open for operations via the other open file handles. If instead this was the last open handle, step 1804 makes a determination (via the context map 134) if any portion of the link file 76 is marked as dirty (allocated). If not, the driver 66' requests closing of the common store file handle, whereby steps 1806 and 1808 cause the common store file 74 to be closed if no other links have the common store file 74 open, otherwise the common store file 74 remains open for the other links to use. Conversely, at step 1804, if any region of the link file 76 was written to and is thus marked as dirty, step 1804 branches to step 1810 since the link file may no longer be properly represented by the common store file 74. Note that steps 1810 and below may take place after the link file handle has been closed, by doing the work in a special system context. This allows the users to access the SIS file while the copyout of clean data is in progress. Step 1810 copies the clean portions from the common store file 74 to space allocated therefor in the link file 76. If successful at step 1812, the now fully-allocated link file is converted back to a regular file at step 1814, essentially by removing the reparse point. In this manner, logically independent links to the common store file are supported, as the changes made to one link file are not seen via any other link file. The link file 76 is then deleted from the list of files in the backpointer stream as described below with reference to FIG. 19, which may further result in the common store file being deleted. The process then continues to steps 1806 and 1808 to close the common store file if no other links have it open. Note that the handle to the common store file needs to be closed even if the common store file was deleted.

However, it is possible that the clean data from the common store file 74 could not be copied back, particularly if the space therefor could not be allocated in the link file 76 due to a disk full condition. If such an error occurs, step 1812 branches to step 1816 which represents the canceling of the copyout and leaving the link file 76 as is, preserving the written data. Note that this will not cause a disk full condition because the space was already allocated to the link file during the earlier write request without an error, otherwise the write request that caused the space to be allocated would have failed and the user notified (FIG. 15, steps 1504–1506). As described above, when the link file is re-opened, step 1322 of FIG. 13B will mark the allocated portions of the link file 76 as dirty in the map 134, whereby the changes are properly returned when the file is read. Step 1816 then continues to steps 1806 and 1808 to close the common store file if no other links have it open.

In a similar manner to the disk full condition, it is thus possible in general to employ the SIS architecture to use the link file 76 to maintain changes (deltas), with the unchanged clean regions backed up by the common store file 74. To this end, instead of copying the clean portions from the common store file and reconverting the link file to a regular file when the file is closed, SIS may keep the link file as a link file with whatever space is allocated thereto. Some criteria also may be used to determine when it is better to convert the link file back to a regular file. For example, a threshold test as to the space saved may be employed to determine when to return a link file to a regular file versus keeping it as a link, whereby only link files with relatively small deltas would be maintained as link files. As a result, SIS may provide space savings with files that are not exact duplicates, particularly if the file contents are almost exactly identical. As mentioned above, the groveler 60 may also identify near-duplicate files for merging in this manner. Notwithstanding, at present SIS preferably employs the copy-on-close technique of FIG. 18, since updates of SIS files and/or writes thereto are likely to be relatively rare.

Figure 19:
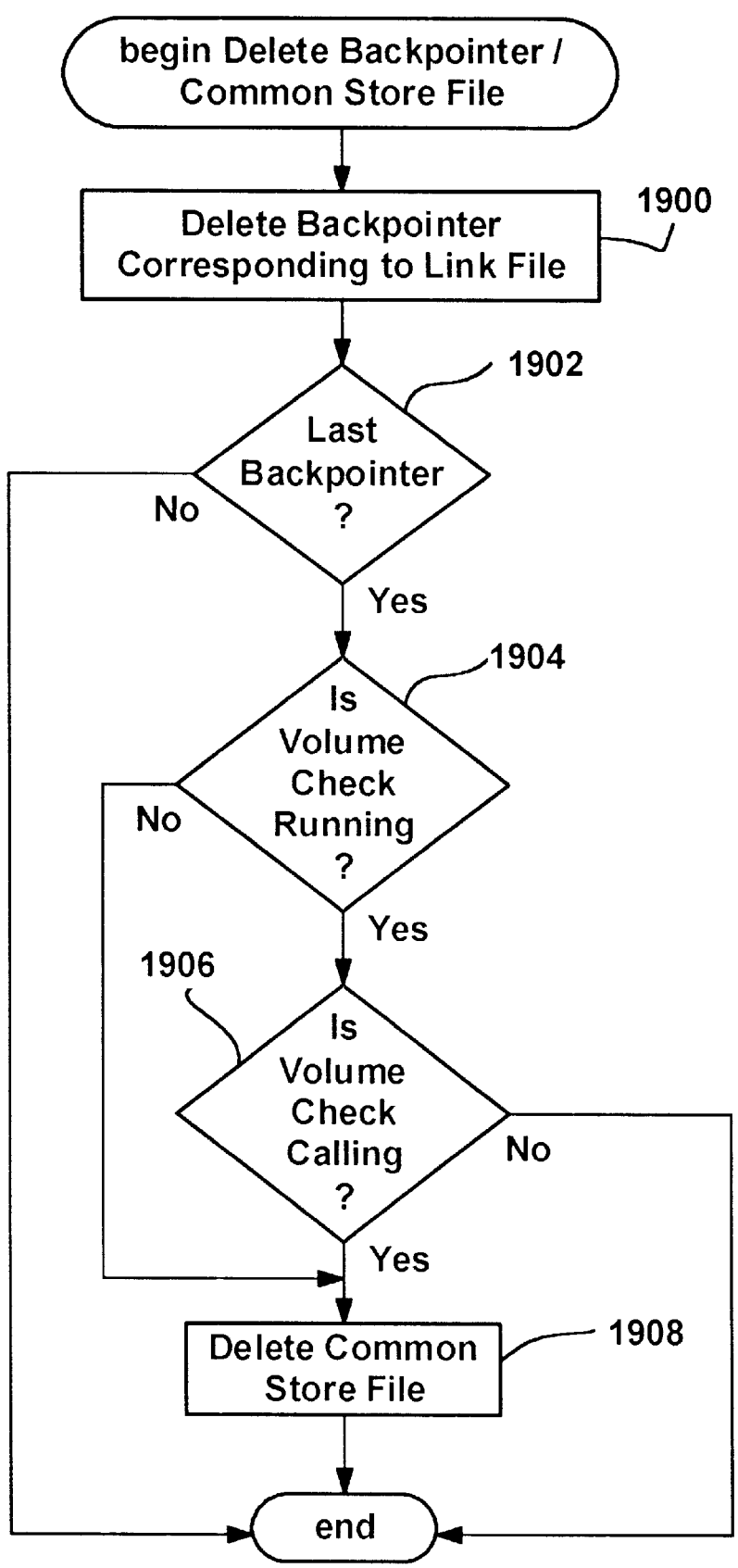
FIG. 19 is a flow diagram generally representing the steps taken by the SIS facility to handle a SIS link file delete request.

Turning to FIG. 19, there is shown a process employed by SIS after a link file is deleted (e.g., by file I/O) or reconverted to a regular file (e.g., by the SIS close process). When a SIS link is deleted or reconverted to a regular file, the common store file 74 corresponding to that SIS link file is not necessarily deleted because other links may be pointing to that common store file 74. Thus, at step 1902, the backpointer stream 124 is evaluated to determine if the deleted backpointer was the last backpointer remaining in the stream, i.e., there are no more backpointers. If it is not the last backpointer, then there is at least one other link file pointing to the common store file 74, the common store file 74 is thus still needed, and the process ends. In this manner, logically independent links to the common store file are again supported, as deleting one link file does not affect any other link file.

If no backpointers remain at step 1902, this generally indicates that no link files are pointing to the common store file and thus the common store file is no longer needed. However, before deleting the common store file, step 1902 branches to step 1904 where a test is performed as to whether the volume check procedure 136 is running. If so, there is a possibility that the backpointer stream is corrupted, as described below. If the volume check is not currently running, step 1904 advances to step 1908 to delete the common store file (after first closing it, if necessary). Otherwise, since the backpointer stream is not necessarily trustworthy, step 1904 branches to step 1906 where it is determined whether the volume check 136 is calling this delete procedure, i.e., whether the steps of FIG. 19 are being invoked from the volume check. If the volume check is not calling to delete the file, step 1906 ends the process without deleting the file, otherwise step 1906 branches to step 1908 to delete the file. Step 1906 thus enables the volume check 136 to delete a common store file when the volume check has concluded that the backpointer stream is correct and no link files point thereto.

In sum, step 1908 deletes the common store file when the backpointer stream is both empty and trusted, thereby reclaiming the disk space. Note that instead of backpointers, counts of the links may be alternatively used for this purpose, i.e., delete the common store file when a count of zero links thereto remain. Backpointers are preferable, however, primarily because they are more robust than counts.

As can be seen from the foregoing detailed description, there is provided a method and system that provide for the identifying and merging of duplicate files. The method and system may operate dynamically as a real time background process, in an efficient manner.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-readable medium having computer-executable instructions, comprising, automatically identifying at least two files having duplicate data, automatically merging the duplicate data of the files into a single instance representation of that data, converting each of the files into logically separate links to the single instance representation, each link comprising a logically separate link file that provides logically separate file system access to the single instance representation of the file data, and reclaiming storage space that was occupied by the duplicate data of at least one of the files.

2. The computer-readable medium having computer-executable instructions of claim 1 wherein automatically identifying at least two files having duplicate data includes, adding file identifiers to a work item queue.

3. The computer-readable medium having computer-executable instructions of claim 2 wherein adding file identifiers to a work item queue includes scanning a volume for file identifiers.

4. The computer-readable medium having computer-executable instructions of claim 3 wherein scanning the volume for file identifiers occurs for a limited time.

5. The computer-readable medium having computer-executable instructions of claim 2 wherein adding file identifiers to a work item queue includes extracting file information from a log of file activity.

6. The computer-readable medium of claim 5 having further computer-executable instructions for calculating a time for extracting file information from the log.

7. The computer-readable medium having computer-executable instructions of claim 6 wherein the time calculated is based on an amount of file information previously extracted from the log.

8. The computer-readable medium having computer-executable instructions of claim 1 wherein automatically identifying at least two files having duplicate data includes, dequeuing a file identifier from a work item queue.

9. The computer-readable medium of claim 8 having further computer-executable instructions for, querying a database of file information for a set of at least one file having properties that match properties of a file corresponding to the identifier dequeued from the work item queue.

10. The computer-readable medium having computer-executable instructions of claim 9 wherein querying the database of file information includes providing a file size of the file corresponding to the identifier dequeued from the work item queue to a database manager.

11. The computer-readable medium of claim 9 having further computer-executable instructions for, calculating a signature of the file corresponding to the identifier dequeued from the work item queue.

12. The computer-readable medium having computer-executable instructions of claim 11 wherein querying the database of file information includes providing the signature to a database manager.

13. The computer-readable medium having computer-executable instructions of claim 12 wherein querying the database of file information further includes providing a file size of the file corresponding to the identifier dequeued from the work item queue to the database manager.

14. The computer-readable medium of claim 9 having further computer-executable instructions for, receiving the set of at least one file having properties that match properties of the file corresponding to the identifier dequeued from the work item queue, and comparing the data of at least one file in the set with the data of the file corresponding to the identifier dequeued from the work item queue.

15. The computer-readable medium having computer-executable instructions of claim 14 wherein comparing the data determines if each file is an exact duplicate of the other.

16. A method of identifying files having similar properties on a file system volume, comprising, in a first operation, adding file information to a queue, in a second operation distinct from the first operation, removing file information from the queue, querying a database with at least one property of a file corresponding to the file information removed from the queue, and receiving a set of at least one file identifier, each file identifier in the set corresponding to a file having at least one similar property of the file corresponding to the file information removed from the queue.

17. The method of claim 16 wherein adding file information to a work item queue includes scanning a volume for file identifier information.

18. The method of claim 17 further comprising limiting the time for scanning the volume.

19. The method of claim 17 wherein adding file information to a work item queue includes extracting file information from a log of file activity.

20. The method of claim 19 further comprising calculating a time for extracting file information from the log.

21. The method of claim 20 further comprising, returning an amount of file information extracted from the log, and using the amount to calculate a next time for extracting file information from the log.

22. The method of claim 16 further comprising calculating a signature of the file corresponding to the file information removed from the queue, and wherein querying the database includes providing the signature to a database manager.

23. The method of claim 22 wherein querying the database further includes providing a file size corresponding to the file information removed from the queue to the database manager.

24. The method of claim 16 wherein querying the database includes providing a file size corresponding to the file information removed from the queue.

25. The method of claim 16 further comprising, comparing data in the file that corresponds to the file information removed from the queue to the data in at least one file corresponding to file identifier information in the set, and if sufficiently similar, merging the files into a single instance representation thereof having independent links thereto.

26. The method of claim 25 wherein comparing the data determines if each file is an exact duplicate of the other.

27. A system for identifying files having similar properties on a file system volume, comprising, a database including file property information, a database manager for querying the database, a work queue, a first component for adding file identifiers to the work queue, and a second component for removing file identifiers from the queue, the second component providing a query to the database manager, the query including property information corresponding to a file identified by a file identifier removed from the queue, the second component receiving a set of file identifiers in response to the query, each identifier in the set corresponding to a file having property information that matches the file property information identified in the query.

28. The system of claim 27 wherein the second component compares the data of the file corresponding to the file identifier removed from the queue with the data of at least one file corresponding to a file identifier returned in response to the query.

29. The system of claim 28 wherein the second component performs a byte comparison of the data in each file to determine if the file data matches exactly.

30. The system of claim 27 wherein if the comparison indicates the file data is similar, the second component calls a facility for merging the files, the facility providing a single instance representation of the file data and logically separate links thereto.

31. The system of claim 27 further comprising a log for recording file activity, and wherein the first component extracts at least some of the file identifiers for adding to the work queue from the log.

32. The system of claim 27 further comprising a third component for scanning a volume to add file identifiers to the queue.

33. The system of claim 27 wherein the file property information includes a file size.

34. The system of claim 27 wherein the file property information includes a signature.

35. The system of claim 34 wherein the second component computes a signature of the file corresponding to the file removed from the queue.

36. The system of claim 27 wherein the first and second components are functions within a single process, and wherein a partition controller corresponding to a file system volume calls the functions.

37. The system of claim 36 including a plurality of partition controllers, each partition controller corresponding to a file system volume, and further comprising a central controller for controlling the operation of the partition controllers.

38. The system of claim 37 wherein the central controller operates the partition controllers as a background process.

39. The method of claim 16 wherein the first operation alternates with the second operation.

40. The method of claim 39 wherein the first operation operates for a limited time, and the second operation operates after the time to remove each set of file information added to the queue in the first operation.

41. A computer-readable medium having computer-executable instruction for performing the method of claim 16.

* * * * *